(12) United States Patent
Fortusini et al.

(10) Patent No.: US 9,921,372 B2
(45) Date of Patent: Mar. 20, 2018

(54) OPTICAL PLUG HAVING A TRANSLATING COVER AND A COMPLIMENTARY RECEPTACLE

(71) Applicant: Corning Optical Communications LLC, Hickory, NC (US)

(72) Inventors: Davide Domenico Fortusini, Ithica, NY (US); Micah Colen Isenhour, Licolnton, NC (US); Christopher Paul Lewallen, Hudson, NC (US); James Phillip Luther, Hickory, NC (US); Percil Watkins, Conover, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/061,122

(22) Filed: Mar. 4, 2016

(65) Prior Publication Data

US 2016/0187591 A1    Jun. 30, 2016

Related U.S. Application Data

(63) Continuation of application No. PCT/US2014/054186, filed on Sep. 5, 2014.
(Continued)

(51) Int. Cl.
*G02B 6/36* (2006.01)
*G02B 6/38* (2006.01)

(52) U.S. Cl.
CPC ......... *G02B 6/3849* (2013.01); *G02B 6/3817* (2013.01); *G02B 6/3821* (2013.01);
(Continued)

(58) Field of Classification Search
None
See application file for complete search history.

(56) References Cited

U.S. PATENT DOCUMENTS 5,259,052 A * 11/1993 Briggs ................ G02B 6/3807
                                                      385/78
5,917,976 A    6/1999 Yamaguchi
(Continued)

FOREIGN PATENT DOCUMENTS

CN    201876572 U    6/2011
CN    102782545 A   11/2012
(Continued)

OTHER PUBLICATIONS

Patent Cooperation Treaty, International Search Report and Written Opinion for PCT/US14/54186, dated Dec. 3, 2014, 20 pages.
(Continued)

*Primary Examiner* — Sung Pak
(74) *Attorney, Agent, or Firm* — Michael E. Carroll, Jr.

(57) ABSTRACT

Disclosed are optical plug connectors and optical receptacles for making optical connections. In one embodiment, the optical plug connector includes an optical portion having an optical interface and a cover for protecting the optical interface. The cover can translate toward the optical interface when connecting the optical plug connector and a portion of the cover allows transmission of optical signals therethrough. The cover has a sliding fit relative to a portion of the housing and may translate on at least one guide surface of the housing.

46 Claims, 23 Drawing Sheets

Related U.S. Application Data

(60) Provisional application No. 61/876,895, filed on Sep. 12, 2013.

(52) U.S. Cl.
CPC ......... *G02B 6/3882* (2013.01); *G02B 6/3885* (2013.01); *G02B 6/3887* (2013.01); *G02B 6/3873* (2013.01)

(56) References Cited

U.S. PATENT DOCUMENTS

| | | | |
|---|---|---|---|
| 6,736,547 | B2 | 5/2004 | Stevens et al. |
| 6,788,868 | B2 | 9/2004 | McLain et al. |
| 7,503,703 | B1 | 3/2009 | Thorson |
| 8,442,375 | B2 | 5/2013 | Bylander et al. |
| 9,022,668 | B2 * | 5/2015 | Ishiguro ............... G02B 6/3893 385/53 |
| 9,304,265 | B2 | 4/2016 | Isenhour et al. |
| 2003/0044125 | A1 * | 3/2003 | Kiani ................... G02B 6/3821 385/78 |
| 2004/0081405 | A1 | 4/2004 | Stevens et al. |
| 2006/0115218 | A1 | 6/2006 | Howard et al. |
| 2011/0103752 | A1 | 5/2011 | Little et al. |
| 2012/0099823 | A1 | 4/2012 | Wu |
| 2013/0028560 | A1 | 1/2013 | Arnold et al. |
| 2013/0089290 | A1 | 4/2013 | Sloey et al. |
| 2013/0136401 | A1 | 5/2013 | Cooke et al. |
| 2013/0195396 | A1 * | 8/2013 | Julien ................... H04B 10/25 385/14 |
| 2013/0195406 | A1 | 8/2013 | Cooke et al. |
| 2013/0322824 | A1 | 12/2013 | Isenhour et al. |
| 2014/0029899 | A1 | 1/2014 | Isenhour et al. |
| 2016/0109660 | A1 | 4/2016 | Fortusini et al. |

FOREIGN PATENT DOCUMENTS

| | | |
|---|---|---|
| DE | 10108783 A1 | 9/2002 |
| EP | 1182478 A1 | 2/2002 |
| GB | 2344469 A | 6/2000 |
| WO | 2011/116167 A1 | 9/2011 |
| WO | 2012/120914 A1 | 9/2012 |
| WO | 2015038413 A8 | 3/2015 |

OTHER PUBLICATIONS

English Translation of CN201480053215.8 Office Action dated Dec. 8, 2016, China Patent Office.

EP Rule 161(1) and 162 Communication issued in corresponding EP Appln. No. 14766363.7, dated Apr. 19, 2016.

CN Official Action issued in corresponding CN Appln. No. 2014800532158, dated Nov. 30, 2016.

* cited by examiner

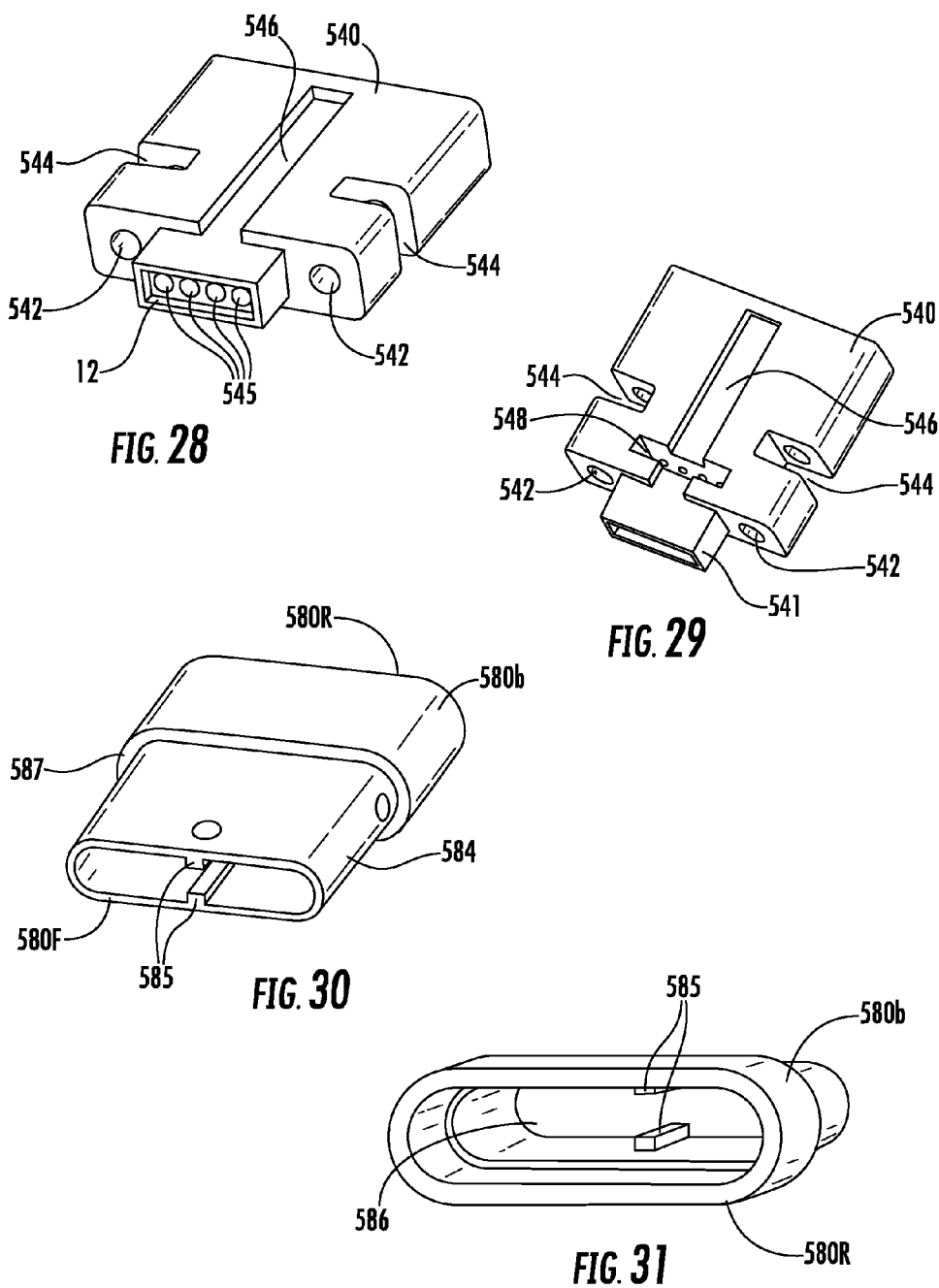

US 9,921,372 B2

1

OPTICAL PLUG HAVING A TRANSLATING COVER AND A COMPLIMENTARY RECEPTACLE

PRIORITY APPLICATION

This application is a continuation of International Application No. PCT/US14/54186, filed on Sep. 5, 2014, which claims the benefit of priority under 35 U.S.C. § 119 of U.S. Provisional Application Ser. No. 61/876,895, filed on Sep. 12, 2013, both applications being incorporated herein by reference.

FIELD

The disclosure is directed to optical connections for use in electronic devices. More specifically, the disclosure is directed to optical connectors such as optical plug connectors having a translating cover along with a complimentary receptacle.

BACKGROUND

As electronic devices move toward operation at faster data rates the electrical interfaces on these devices along with the electrical transmission cables will reach their bandwidth capacity limitations. Additionally, the electronic devices are trending to smaller and thinner footprints. Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime. Consequently, optical connections for consumer application will need to be easy to clean and maintain by the user.

There is an unresolved need for optical connections that may be used for relatively small devices like typical consumer applications such personnel devices such as smart phones, tablets and other consumer devices that have a relatively small footprint. The concepts disclosed herein solve this unresolved need for optical connections.

SUMMARY

The disclosure is directed to an optical plug connector including an optical portion having an optical interface and a cover for protecting the optical interface. The cover can translate toward the optical interface when connecting the optical plug connector and a portion of the cover allows transmission of optical signals therethrough. However, the concepts disclosed may be used with an optical connection disposed on a device such as a receptacle disposed on an electronic device.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 28 and 29 are top and bottom perspective views of the optical portion of the optical plug connector of FIGS. 17 and 18;

FIGS. 30 and 31 are front and rear perspective views of a portion of the housing of the optical plug connector of FIGS. 17 and 18;

DETAILED DESCRIPTION

Figure 1:
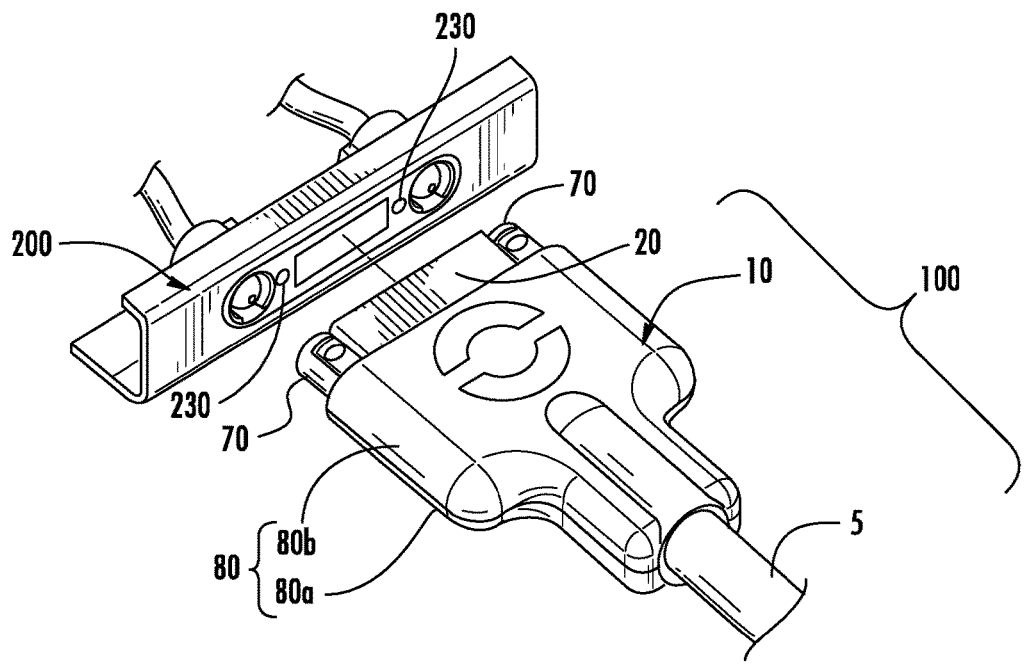
FIG. 1 is a perspective view of an optical plug connector as part of a cable assembly being aligned with a complimentary receptacle according to the concepts disclosed herein.

Reference will now be made in detail to the embodiments of the disclosure, examples of which are illustrated in the accompanying drawings. Whenever possible, like reference numbers will be used to refer to like components or parts.

The optical connections disclosed herein enable high-speed data applications for transmitting optical signals to electronic devices such as fast data rates such as 5 Gigabits/sec or greater along with having a relatively small and compact footprints so that they are useful for use with electronic devices such as consumer devices and the like. The concepts disclosed include an optical plug connector having a cover that can translate during mating and a complimentary optical receptacle that mates with the optical plug connector. The optical receptacle may be a portion of an electronic device such as a telephone, laptop, tablet, display, camera, desktop computer or the like so it can receive and transmit optical signals from the optical plug connector. The concepts disclosed may solely have optical connectivity or have hybrid connectivity with optical and electrical. Further, the concepts of the optical connections may be used in other applications such as optical backplanes, switches, routers and other equipment.

In order to transmit/receive optical signals, the optical plug connector or optical receptacle may include one or more optical channels for that may include one or more lenses or not as desired. By way of example, the one or more lenses of the optical plug connector are used for collimating or focusing the light from the transmission channel(s) of the plug and are optically coupled to a complementary lenses of the optical receptacle such as molded lenses that direct the optical signal to an active element such as a photodiode or the like. The receive channels of the optical plug connector obtains its signals from an active element such as a laser like a vertical-cavity surface-emitting laser (VCSEL) in communication with the molded lens of the optical receptacle for transmission of the optical signals of the optical plug connector when the optical plug connector and optical receptacle are mated together. The optical plug connector and optical receptacle according to the concepts disclosed provide quick and easy connectivity with a footprint that is advantageous for use with electronic devices having thin and compact profiles. Further, the concepts provide a simple optical plug assembly with a cover that protects the lenses or optical channels of the optical plug connector from dirt and debris and allows access for easy cleaning of the cover (e.g., accessible for wiping) and/or replacing of the cover if desired or necessary to due to damage. Moreover, the cover of the optical plug connector translates from a forward position to a retracted position, but unlike other connector designs the optical interface does not appreciably translate in the Z-direction and instead may "float" to a small degree for optical alignment. Thus, because the concepts disclosed do not require translation of the optical portion like conventional designs, the issues with optical alignment and/or optical fiber movement with the optical portion are inhibited. Additionally, the optical plug connector is a robust and reliable design for applications that are expected to experience large number of mating/unmating cycles such as consumer electronic applications.

Figure 2:
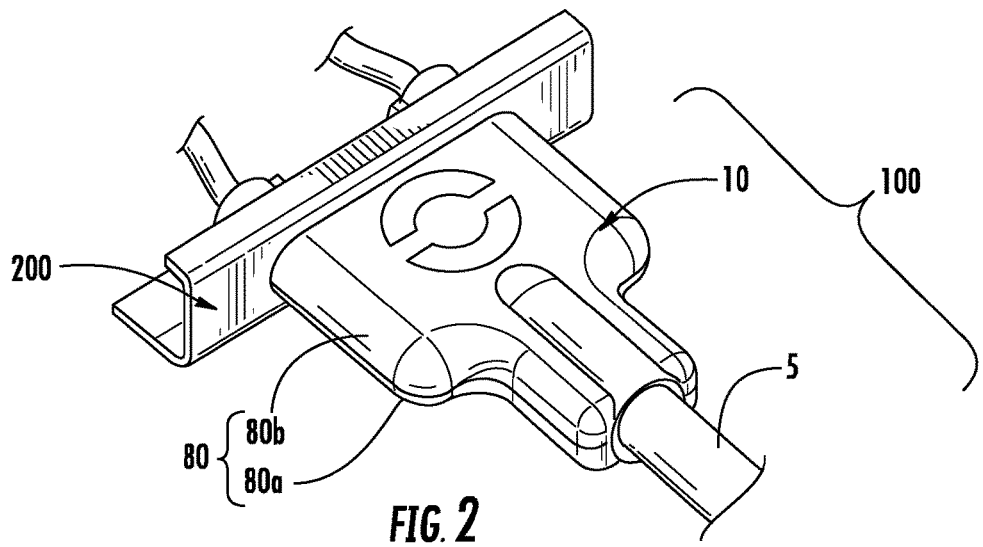
FIG. 2 is a perspective view of the optical plug connector and the complimentary receptacle of FIG. 1 shown mated together.

FIG. 1 is a perspective view of an optical plug connector 10 (hereinafter "plug") being a portion of a cable assembly 100 as it is being aligned with a complimentary receptacle 200 and FIG. 2 is a perspective view of plug 10 of cable assembly 100 mated with receptacle 200. Although, the concepts disclosed are described with respect to a plug the concepts disclosed may be used with an optical connection disposed on a device such as a receptacle disposed on an electronic device.

Plug 10 is attached to cable 5, thereby forming cable assembly 100. Cable assembly 100 may use any suitable cable 5 attached to the plug. Although, the cable 5 and plug 10 are shown having a straight through alignment for simplicity sake, the concepts of the plug disclosed herein may have any suitable angle with respect to the cable such as 45, 60 or 90 degrees, but still other angles are possible.

Figure 7:
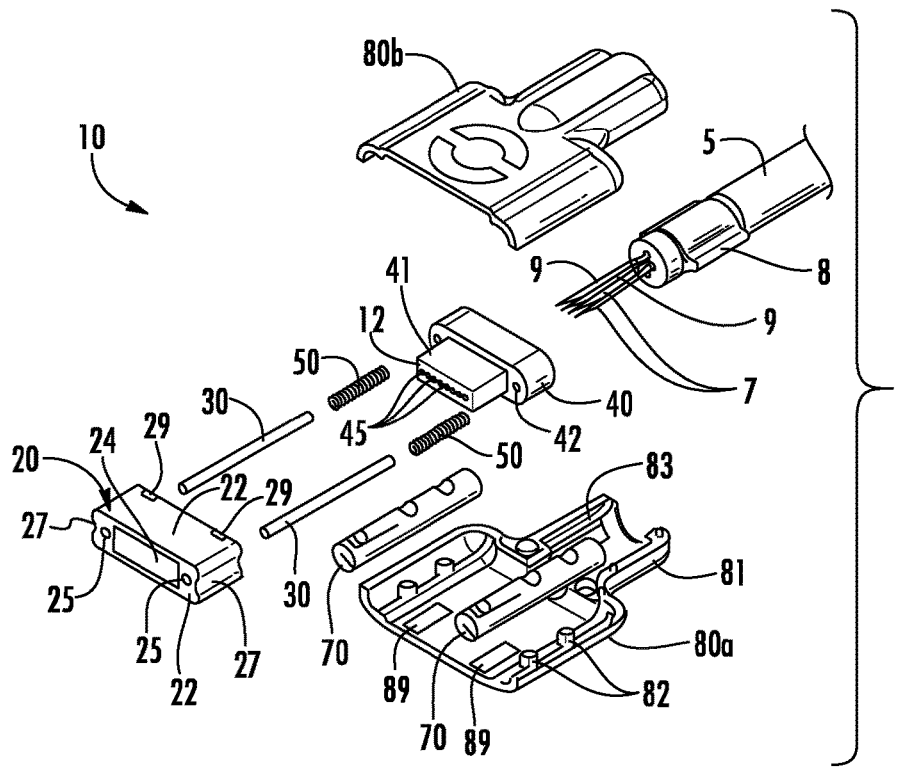
FIG. 7 is a front exploded view of the optical plug connector of FIGS. 1 and 2 along with a cable prepared for assembly with the optical plug connector.

Plugs according to the concepts disclosed may have an optical portion with an optical interface or both an optical portion with an optical interface and an electrical portion with an electrical interface. As shown in this explanatory embodiment, plug 10 and complimentary receptacle 200 both have an optical interface and an electrical interface. For instance, plug 10 optionally includes one or more electrical contacts 70 in addition to an optical portion 40 having an optical interface 12 (FIG. 7). Consequently, the plug 10 and complimentary receptacle 200 may transmit/receive signals and/or power as desired.

Figure 3:
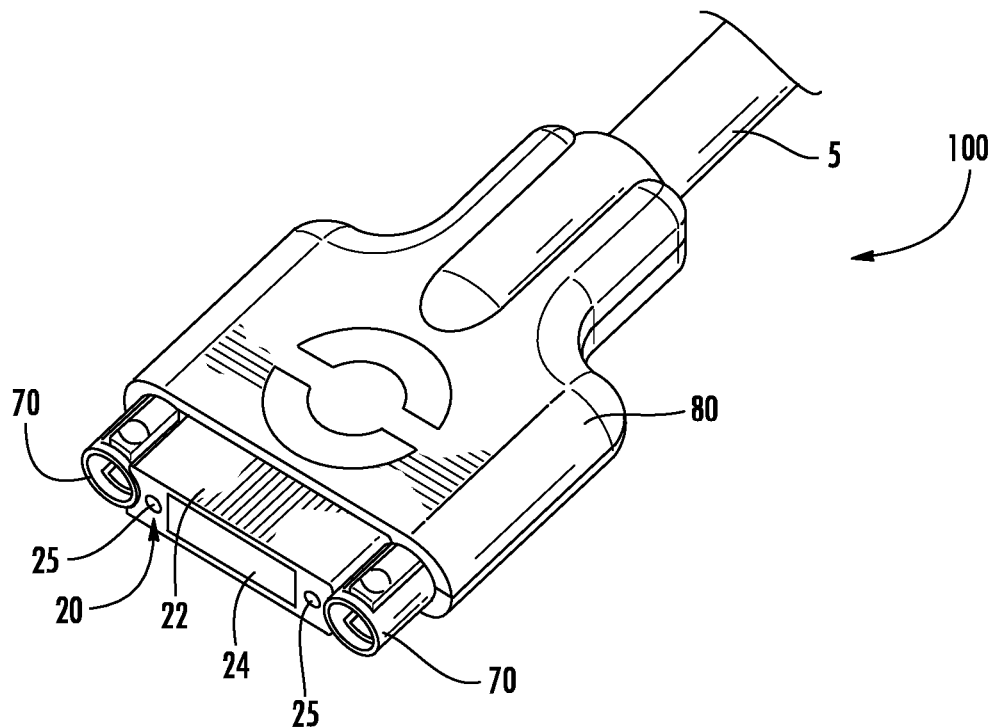
FIG. 3 is a front perspective view of the optical plug connector of FIGS. 1 and 2 shown with the cover in a forward position.
Figure 4:
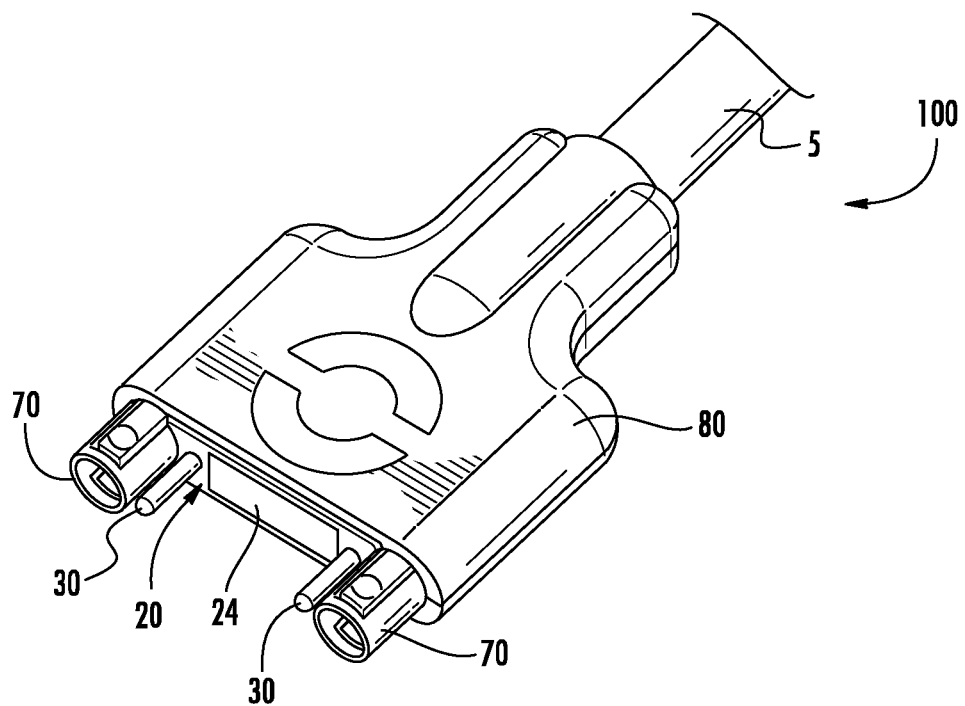
FIG. 4 is a front perspective view of the optical plug connector of FIGS. 1 and 2 shown with the cover in a retracted position such as occurs when the optical plug connector is mated with the receptacle.

FIGS. 3 and 4 are front perspective views of plug 10 shown respectively with a cover 20 in a forward position and the cover 20 in a retracted position such as occurs when the optical plug connector is mated with the receptacle 200 such as shown in FIG. 2. In other words, cover 20 can translate toward the optical interface 12 (FIG. 7) when connecting the plug 10 connector and a portion of cover 20 allows transmission of optical signals therethrough. The cover 20 may have a manual operation for the retraction/extension with a user activated slide or it may be biased to an extended position as desired. Moreover, the optical portion 40 does not translate like cover 20, but instead the optical portion may "float" for optical alignment with the complimentary receptacle. As used herein, "float" means relatively small movements or shifting for the optical alignment of optical portions of the plug. Consequently, the plug designs disclosed are advantageous over conventional designs where the optical portion translates since the optical fibers are not disturbed by significant movements and/or the optical interface is protected and not exposed to potential damage, dirt, debris and the like.

Cover 20 protects the optical interface 12 from dirt, debris and contact, etc. when in both the extended position (FIG. 3) and retracted position (FIG. 4). By way of example, cover 20 may include a body 22 and a window 24 attached to the body 22 where the window 24 allows the transmission of optical signals therethrough. Further, cover 20 may be inspected or cleaned by the user as desired. Cover 20 may even be removed and replaced if desired. Cover 20 translates from the extended position to the retracted position using one or more cover guides. Cover guides may be any suitable structure disposed on any suitable component such as grooves, protrusions or rails disposed on a housing 80 and/or cover 20, recesses or bores located on cover 20, alignment pins, etc. as desired. In some plug embodiments many cover guides may exist for guiding the translation of the cover 20 as desired. By way of example, cover 20 of plug 10 has several different cover guides. First, plug 10 includes cover guides configured as one or more alignment pins 30 that cooperate with cover 20 that includes one or more bores 25 for receiving the alignment pins 30 as best shown in FIG. 4. Although, alignment pins 30 are also used for alignment of the optical interface 12, bores 25 of cover 20 need not have a precision fit with the alignment pins 30 since the translation of cover 20 does not impact optical alignment of the plug 10. As shown in FIG. 4, when cover 20 is in the retracted position the one or more alignment pins 30 extend forward of the cover 20 and may be used for aligning the optical interface 12 of plug 10 with receptacle 200 by cooperating with one or more bores 230.

Figure 8:
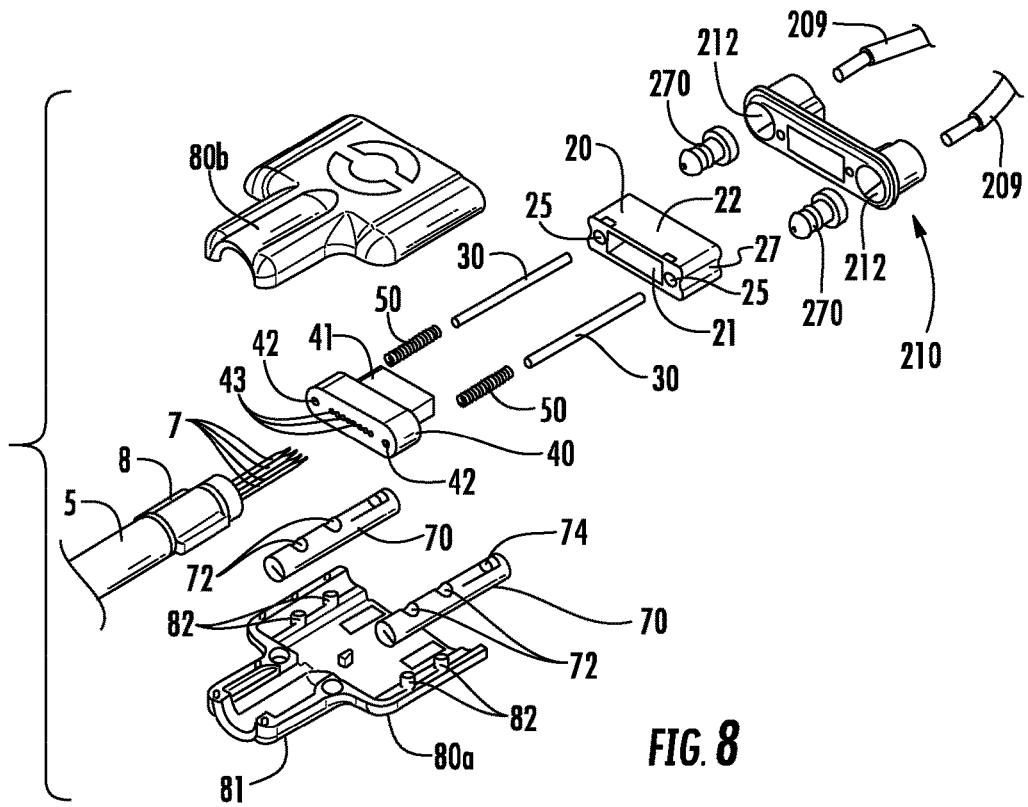
FIG. 8 is a rear exploded view of the optical plug connector of FIG. 7 along with a portion of the complimentary receptacle.

Plug 10 also includes a second cover guide structure formed on the cover 20. Specifically, cover 20 has one or more recesses 27 that are cover guides. Recesses 27 generally conform with a portion of the one or more electrical contacts 70. More specifically, recesses 27 are concave recesses disposed on opposite ends of cover 20 and generally conform to the round shape of electrical contacts 70 so that the cover moves uniform distances on both ends when translating. Finally, plug 10 has third cover guides with the cover 20 cooperating with the housing 80. Specifically, cover 20 has one or more protrusions 29 that are cover guides. Protrusions 29 are disposed on the top and bottom portions of cover 20 and cooperate with one or more grooves 89 disposed on the inside of housing 80 as shown in FIGS. 7 and 8. Moreover, protrusions 29 act as stops so that the cover 20 remains secured within the housing 80 when in the extended position since the grooves 89 do not extend to the front end of housing 80; however, cover 20 may be removed. To remove the cover 20, the user simply squeezes the rear portion of cover 20 to deflect the protrusions inward and then the cover 20 may be removed. Consequently, the user may have access to inspect, wipe and/or clean the optical interface 12 behind the cover 20 of the plug 10 as desired, or for replacing the cover 20 if it is damaged.

Cover 20 may have any suitable configuration for the given plug design. For instance, the window 24 may be formed from any suitable material such as a polymer such as Ultem® or Zeonex® or a glass such as a chemically strengthened glass such as available from Corning, Incorporated of Corning, N.Y. As an example, the window 24 may be Gorilla® Glass available from Corning Incorporated. Moreover, the window 24 may optionally have a suitable coating such as an anti-reflection coating and/or a scratch-resistant coating as desired. In other embodiments, the window 24 may have multiple coatings and/or multi-layer coatings. By way of example, window 24 may have an anti-reflection coating on the side facing the optical interface 12 and the other side of window 24 may have the anti-reflection coating plus a hydrophobic and oleophobic coating thereon. The hydrophobic and oleophobic coating providing improved cleaning properties for the window 24. In other embodiments, the cover 20 is formed as a single component. By way of example, the cover 20 may be formed entirely from a polymer that is transmissive to the optical signals. Plug 10 is suitable for applications that anticipate a relatively large number of mating/unmating cycles or environments that may be exposed to dirt and debris such as consumer devices; however, suitable materials for components should be selected to withstand the desired number of mating cycles. Further, the cover may be operable to translate any suitable distance. By way of example, the cover may translate 3 mm or more toward the optical interface. Other embodiments may have the cover translate 5 mm or more, and still further embodiments may have the cover translate 7 mm or more toward the optical interface.

Figure 5:
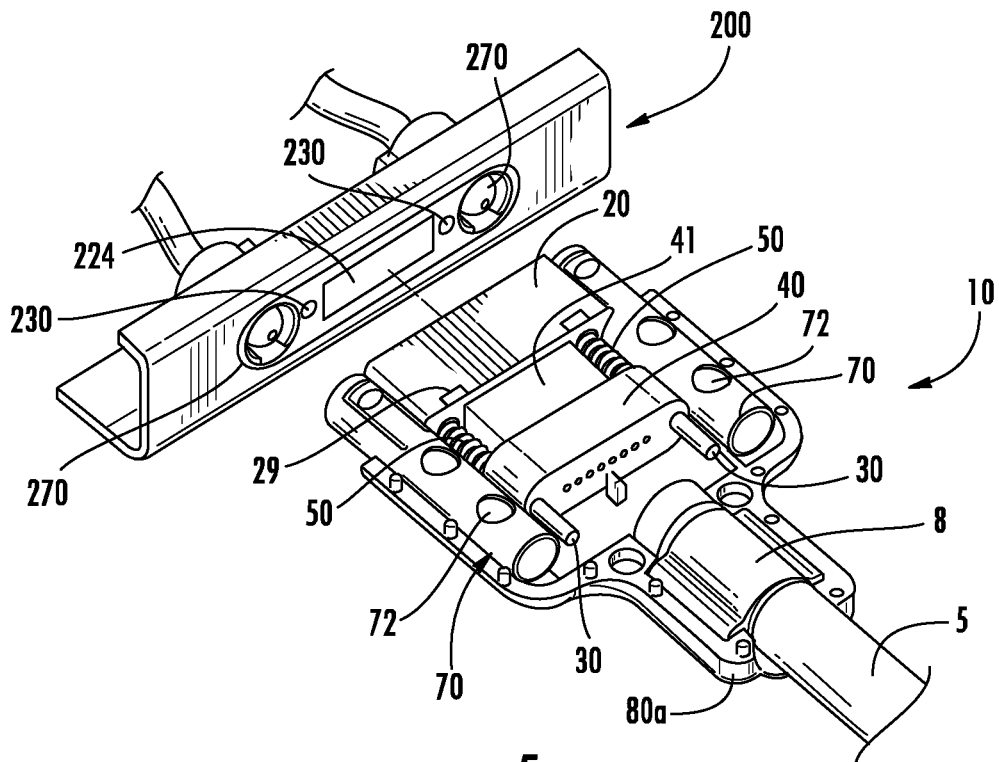
FIGS. 5 and 6 respectively depict the optical plug connector and complimentary receptacle of FIGS. 1 and 2 aligned for mating and in contact before mating with a portion of the housing removed from the plug in both FIGS. 5 and 6 for showing internal details.
Figure 6:
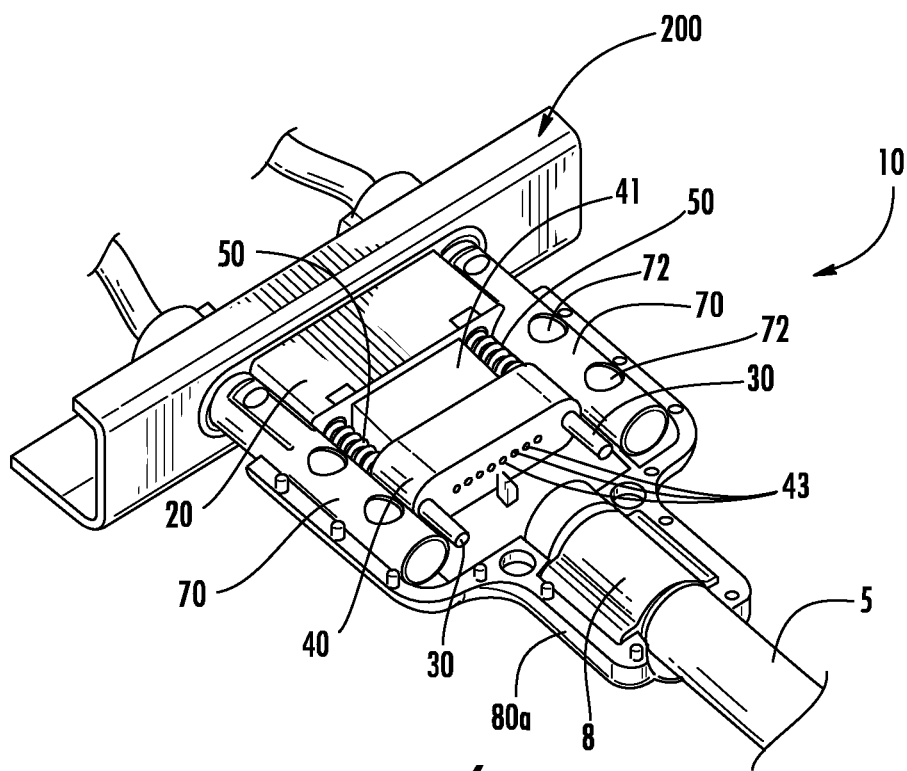

FIGS. 5 and 6 respectively depict the plug 10 (with a portion 80b of the housing 80 removed) and receptacle 200 aligned for mating and in contact before mating together. When assembled, the components of plug 10 are at least partially disposed in housing 80 that has a first portion 80a and a second portion 80b. As depicted, plug 10 may also include one or more resilient members 50 for biasing cover 20 to an extended position (e.g., forward position). Resilient member 50 may have any suitable construction such as leaf springs or the like. In embodiment resilient members 50 are coil springs. The coil springs are located between the optical portion 40 and cover 20 and disposed on respective alignment pins 30 as shown. Consequently, cover 20 may move to the retracted position guided in part by alignment pins 30 and biased forward by resilient members 50. As shown, optical portion 40 has alignment pins 30 attached using one or more bores 42 (FIGS. 7 and 8) and is disposed between electrical contacts 70 with a nose 41 of optical portion 40 aligned with a cavity 21 (FIG. 8) at a rear of cover 20. When cover 20 moves rearward the nose 41 engages cavity 21 of cover 20 when in a retracted position. Thus, when the cover 20 is in the retracted position the window 24 of cover 20 is in close proximity to the optical interface 12 of the optical portion 40 for allowing the transmission of optical signals through the window 24 and to/from optical interface 12. One or more electrical contacts 70 are secured between the first portion 80a and second portion 80b of housing 80. Specifically, electrical contacts 70 include one or more openings 72 that receive one or more protrusions 82 of first and second portions 80a,80b of housing 80 and secure the electrical contacts 70 in position. When assembled, a portion of electrical contacts 70 extend beyond housing 80 for making electrical connections with one or more electrical contacts 270 of receptacle 200 when mated together. Electrical contacts 70 also include one or more detents 74 for engagement with the electrical contacts of receptacle 200. First and second portion 80a,80b of housing 80 are aligned and secured together using attachment features 82 such as pins and bores that align; moreover, the first and second portions 80a,80b may be the same part that assembles to itself. Although electrical contacts are depicted as being round any suitable size, shape or style of electrical contact may be used with the concepts disclosed such as pins, tubes, blades, rails or other suitable contacts.

FIGS. 7 and 8 are respective front and rear partially exploded views of the plug 10 along with cable 5 prepared for assembly with plug 10. Plugs and receptacles may have any suitable number of optical channels arranged in any desired pattern such as a linear or round array of optical channels. In this plug embodiment, optical interface 12 has a plurality of optical channels are arranged in a linear array. Optical interface 12 includes a plurality of lens 45 integrally formed in the optical portion 40 and is formed from an optically transmissive material for desired wavelengths. Other embodiments may have the lenses formed as a separate component(s) if desired, but using a single component with integral lenses aids in controlling registration of the lenses with the bores 42 that cooperate with alignment pins 30. Additionally, an index-matching material may be used between the ends of the respective optical fibers and the face of optical portion 40 on the side where the optical fiber is inserted into the optical portion 40 for reducing optical reflection, scattering, and loss by eliminating any air gaps between the fiber end and the optical portion 40.

Cable 5 of this embodiment includes both optical fibers 7 and electrical conductors 9 as shown. The optical fibers 7 are cleaved to a proper length and inserted into respective fiber bores 43 on the rear portion of optical body 40 for optical communication with the lenses. An index-matching material may be used on the ends of the optical fibers 7 for improving optical coupling with the optical portion 40. Electrical conductors 9 are electrically connected with the electrical contacts 270 in a suitable manner. A crimp band 8 is attached near and end of cable 5 for creating a demarcation point for the optical fibers 7 and electrical conductors 9 and is used for securing the cable 5 to housing 80. When deformed about cable 5, crimp band 8 has one or more wings that fit into a saddle 83 of housing 80 for attaching the cable 5 to plug 10 and inhibiting relative movement therebetween and along with strain-relieving the cable 5 to the plug 10. If desired, a filling material such as an adhesive, silicone, a sleeve, an insert or the like may be injected or placed into the passageway of the cable for protecting the optical fibers. Thereafter, the first and second shells 80a,80b of housing 80 can be assembled about the components.

Receptacle 200 may also optionally include one or more electrical contacts 270 for transmitting electrical signals or power as desired that fit into a receptacle body 210. Electrical contacts 270 fit into a plurality of respective openings 212 of receptacle body 210 and are electrically connected to electrical conductors 209 of the electronic device such as a tablet, smart phone, display or the like.

Other components of the receptacle 200 and the signal conversion components for the electronic device will be discussed.

Receptacle 200 may include a receptacle circuit board attached to the receptacle body 210 that electrically connects to a complimentary circuit board of the electronic device. The receptacle circuit board includes an electrical interface and one or more integrated circuits for processing signals along with other components as desired for communicating with the electronic device. Receptacle 200 may include a receptacle circuit board assembly attached to the lens body of the receptacle 200. When the electronic device is assembled, the receptacle circuit board assembly is electrically attached to circuit board of the electronic device for communicating signals between the receptacle and the circuit board of the electronic device. For instance, receptacle 200 is configured with a flexible tether having pluggable electrical attachment to circuit board of the electronic device. Specifically, circuit board of the electronic device includes an electrical connector for cooperating with a complementary electrical connector of the receptacle circuit board assembly for easily making the appropriate electrical connections between the circuit board of the electronic device and the receptacle circuit board assembly. Of course, other electrical connectivity may be used with the concepts disclosed.

The receptacle circuit board assembly is used for converting the optical signals to electrical signals and vice versa and may have any suitable arrangement or layout. The receptacle circuit board assembly includes at least one active component aligned with at least one optical channel of the optical body of the receptacle when properly aligned and attached to lens body of the receptacle. The receptacle circuit board assembly is attached to the lens body and spaced at a suitable distance from the lenses using ledges or other structure, which provides the desired z-direction distance between the active component and the lens body. The receptacle circuit board assembly may use a passive and/or active alignment for positioning the receptacle circuit board assembly in the X-direction and Y-direction. Active component(s) are an electro-optical component used for transmitting or receiving optical signals to/from the optical channels of the lens body of the receptacle 200. By way of example, the active component is a photodiode or other similar device for receiving optical signals or a vertical-cavity surface-emitting laser (VCSEL) for transmitting optical signals, thereby providing one or more transmit and receive channels. Additionally, the receptacle circuit board assembly may include further electronic components such as transimpedance amplifiers (TIAs) or laser drivers arranged as a first circuit portion and/or a second circuit portion for processing signals and other electronics such as integrated circuits (ICs) like clock and data recovery (CDR), laser drivers serializer/deserializer (SerDes), and the like on the circuit board.

The optical channels of the receptacle 200 include respective lenses at the rear side of the optical body for focusing or collimating the optical signals to/from the active components on the receptacle circuit board. "Operably attached" means that the active components of the receptacle circuit board assembly are properly spaced from the optical channels of the lens body (z-direction) such as the lenses of the optical body maintain the desired distance between the active components and the optical channels and suitable aligned in the x-direction and y-direction for providing the desired level of optical coupling.

The flexible substrate for electrical connection allows an electrical turn so that the profile of the device may remain small such as thin when electrically connecting the receptacle circuit board assembly having the active components (e.g., photodiodes and VCSELs), transimpedence amplifier (TIA), and the laser drivers to the other integrated circuits on the circuit board of the electronic device. Splitting the electronics between the receptacle circuit board assembly that is attached to the lens body 210 and other components on the circuit board of the electronic device such as the clock and data recovery (CDR) IC and SerDes IC allow for smaller receptacle footprints and keeps the specific electrical traces to/from the active components such as the TIA or laser drive to short lengths such as 200 microns or less and the electrical traces may even be about 100 microns or less. Specifically, the flexible substrate provides an electrical turn with flex coupling between the receptacle circuit board assembly and circuit board of the electronic device, thereby allowing relatively small form-factors for the optical connector since the CDR and SerDes IC's are relatively large and are located on another circuit portion such as the electronic device circuit board that can be orientated in different manner such as a horizontal plane where there is more space available.

Receptacle circuit board assembly may also include other advantageous arrangements when having optical connectors with more than one transmit and one receive channel. For instance, the receptacle circuit board assembly may use separate TIAs and/or laser drivers on the receptacle circuit board assembly (i.e., several TIAs or laser drivers for different optical channels). Consequently, a first circuit portion with the TIAs and laser drivers can now be split (i.e., multiple TIAs and laser drivers) with a dedicated TIA and laser driver placed onto each side of the plurality of optical channels that are arranged in an array. If using a receptacle circuit board assembly with multiple TIA/laser driver arrangement (e.g., one TIA/laser driver for each side of the array) for enabling a relatively small height H for the receptacle 200, thereby allowing use of the optical connector in thin devices such as smart phones, tablets and the like. Further, placing electrical components such as the TIA and laser drivers relatively close to the active components such as photodiodes and VCSELs allows relatively short wire bond lengths such as 100 microns or shorter for supporting high-speed data transfer rates such as 10 Gb/sec or more and even up to 20 Gb/sec and higher.

When assembled, the lens body attaches to receptacle body 210. The lens body may have an optional cover attached thereto for protecting the optical interface. In other words, the cover may protect the lenses that form the optical channels of the receptacle 200. The cover of receptacle 200 may be formed from any suitable material such as glass or a polymer as discussed herein.

Figure 9:
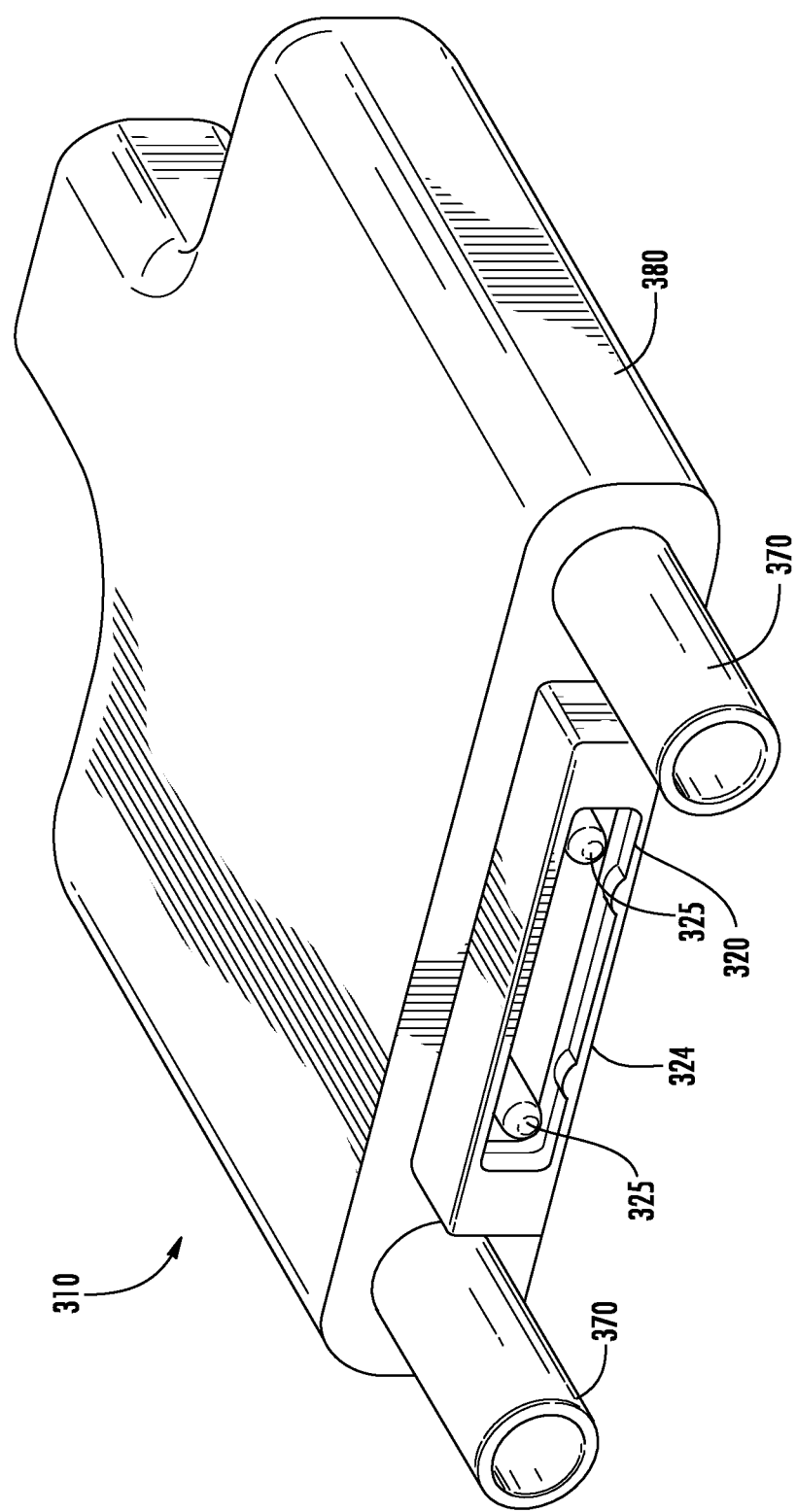
FIG. 9 is a front perspective view of another optical plug connector shown with the cover in a forward position.
Figure 10:
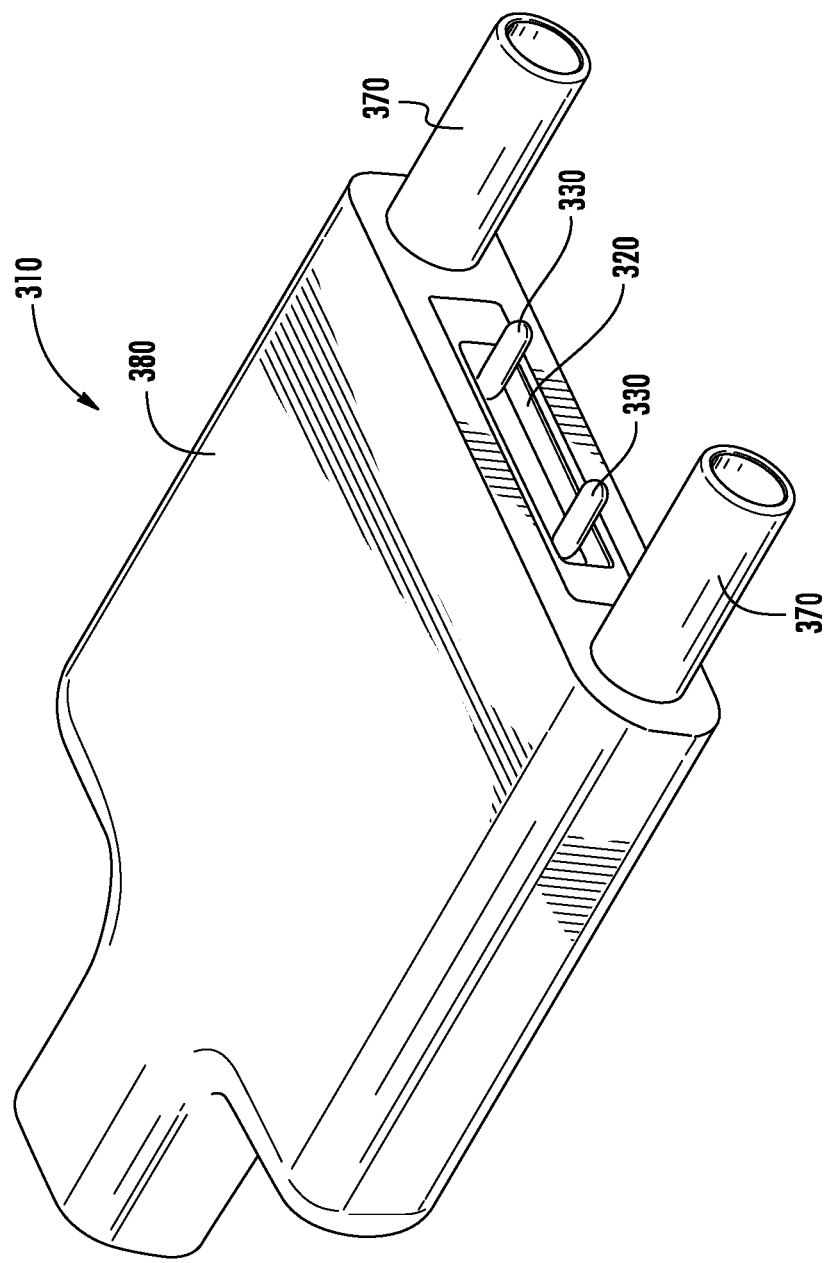
FIG. 10 is a front perspective view of the optical plug connector of FIG. 9 shown with the cover in a retracted position such as occurs when the optical plug connector is mated with a complimentary receptacle.

Other variations of plugs and receptacles are possible according to the concepts disclosed herein. By way of example, FIGS. 9-14 show another explanatory plug embodiment having a cover for protecting the optical interface where the cover can translate toward the optical interface when connecting the optical plug connector and a portion of the cover allows transmission of optical signals therethrough. FIG. 9 is a front perspective view of another optical plug connector 310 (hereinafter plug 310) shown with a cover 320 in a forward position and FIG. 10 shows plug 310 shown with the cover 320 in a retracted position such as occurs when the optical plug connector is mated with a complimentary receptacle. Plug 310 is similar to plug 10 and differences will be highlighted as appropriate. Like plug 10, plug 310 has a cover 320 that translates between a forward position and a retracted position using one or more cover guides. In this embodiment, one of the cover guides is a monolithic alignment pin 330 (FIGS. 11 and 12) and the cover 320 has bores 325 (e.g., disposed on the window 324) for receiving the monolithic alignment pin 330. However, the biasing of the cover 320 to a forward position is independent of the monolithic alignment pin 330 (e.g., no springs riding on the monolithic alignment pin) that also is used for optical alignment of the optical interface 12. Additionally, the length of the monolithic alignment pin may also be longer for optical alignment for this embodiment. Consequently, all things being equal optical alignment of the optical interface 12 should be more precise since there will not be any biasing forces that interacting with the monolithic alignment pin 330. Plug 310 also includes one or more optional electrical contacts 370. Electrical contacts 370 extend beyond a housing 380 and are fixed in position by being secured between a first portion 380a and a second portion 380b of housing 380. Specifically, first portion 380a and second portion 380b of housing 380 include one or more recesses 382 sized and shaped for receiving electrical contacts 370 and electrical contacts 370 are electrically attached to electrical conductors of the cable.

Figure 11:
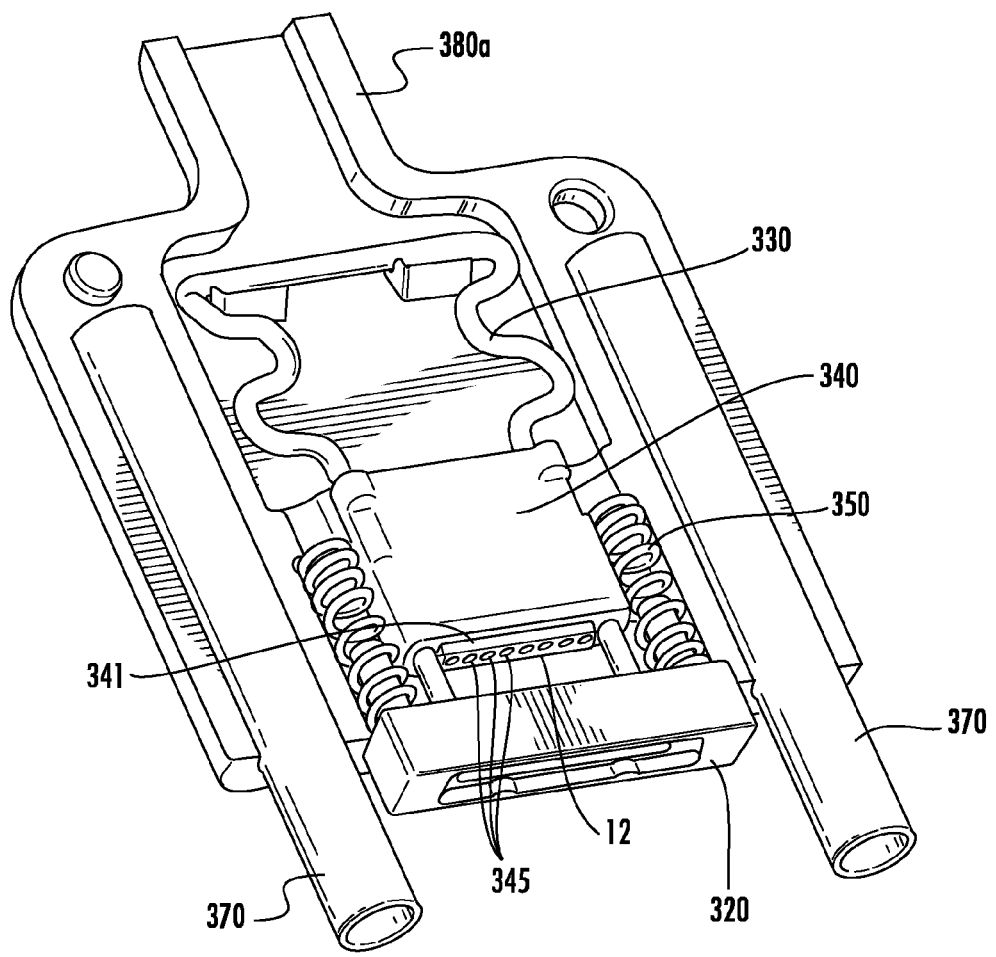
FIG. 11 is a top perspective view of the optical plug connector of FIGS. 9 and 10 shown with the cover in a forward position and a portion of the housing removed.
Figure 12:
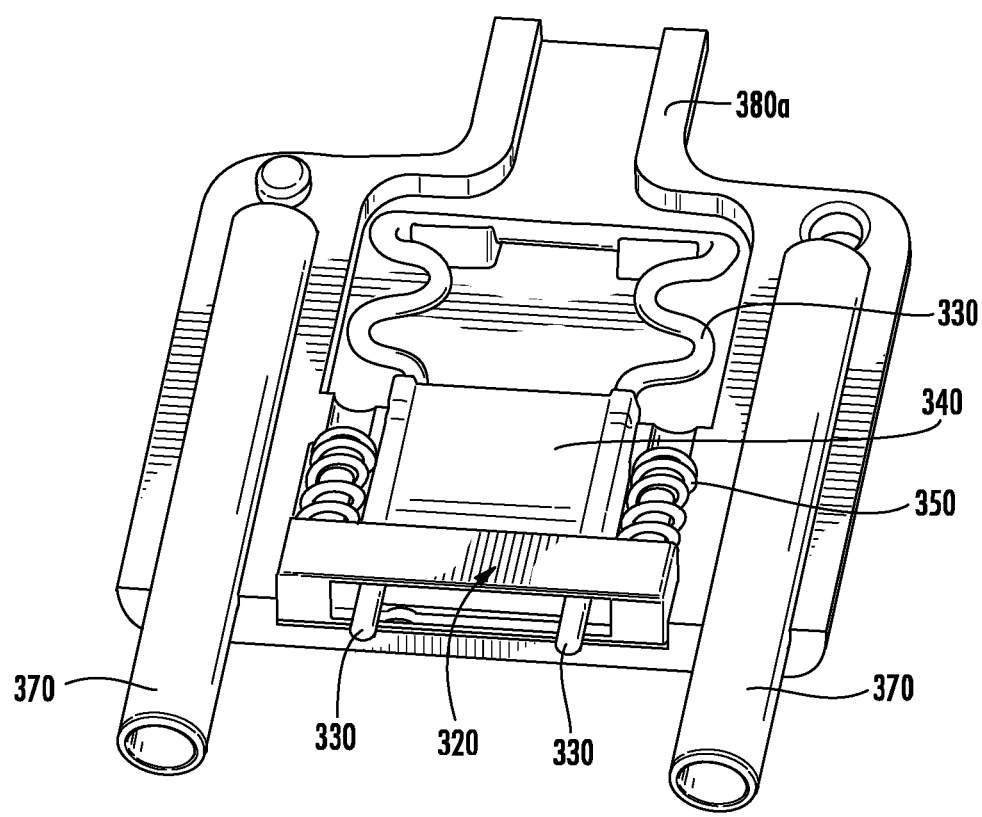
FIG. 12 is a top cutaway perspective view of the optical plug connector of FIGS. 9 and 10 shown with the cover in a retracted position and a portion of the housing removed.

FIG. 11 is a top perspective view of plug 310 shown with the cover 320 in a forward position and FIG. 12 is a top perspective view of plug 310 shown with the cover in a retracted position with both views having second portion 380b of housing 380 removed. As depicted, the monolithic alignment pin 330 has a generally serpentine form and is provided to enable some small float or deflection for the optical portion 340 having the optical interface 12. Monolithic alignment pin 330 is secured in housing 380 using one or more tabs and/or cutouts to inhibit movement. Optical portion includes a nose 341 that engages a cavity of cover 320 when in a retracted position; however, other embodiments may eliminate the nose and have a flat front end for the optical portion if desired. As depicted, plug 320 includes one or more resilient members 350 for biasing the cover 320 to a forward position. Resilient members 350 are coil springs that are seated on protrusions 327 of a body 322 of cover 320. Moreover, when approaching the fully retracted position protrusions 327 of cover 320 are at least partially received in guides 389 formed in the first and second portions 380a,380b of housing 380. Guides 389 also act as backstops for the resilient members 350 when the plug 320 is assembled.

Optical portion 340 includes optical interface 12 having a plurality of lenses 345 integrally formed in the optical portion 340 and is formed from an optically transmissive material for desired wavelengths. Other embodiments may have the lenses formed as a separate component(s) if desired, but using a single component with integral lenses aids in controlling registration of the lenses 345 with the bores 342 that cooperate with monolithic alignment pin 330. Optical portion 340 includes fiber bores (not visible) at the rear end that extend toward the lenses 345 for insertion of the respective optical fibers of the cable and are in optical alignment with the lenses 345 for optical communication therebetween. As discussed, an index-matching material may be used between the ends of the respective optical fibers inserted and the face of optical portion 40 on the side where the optical fiber is inserted into the optical portion 40 for reducing optical reflection, scattering, and loss by eliminating any air gaps between the fiber end and the optical portion 40.

Figure 13:
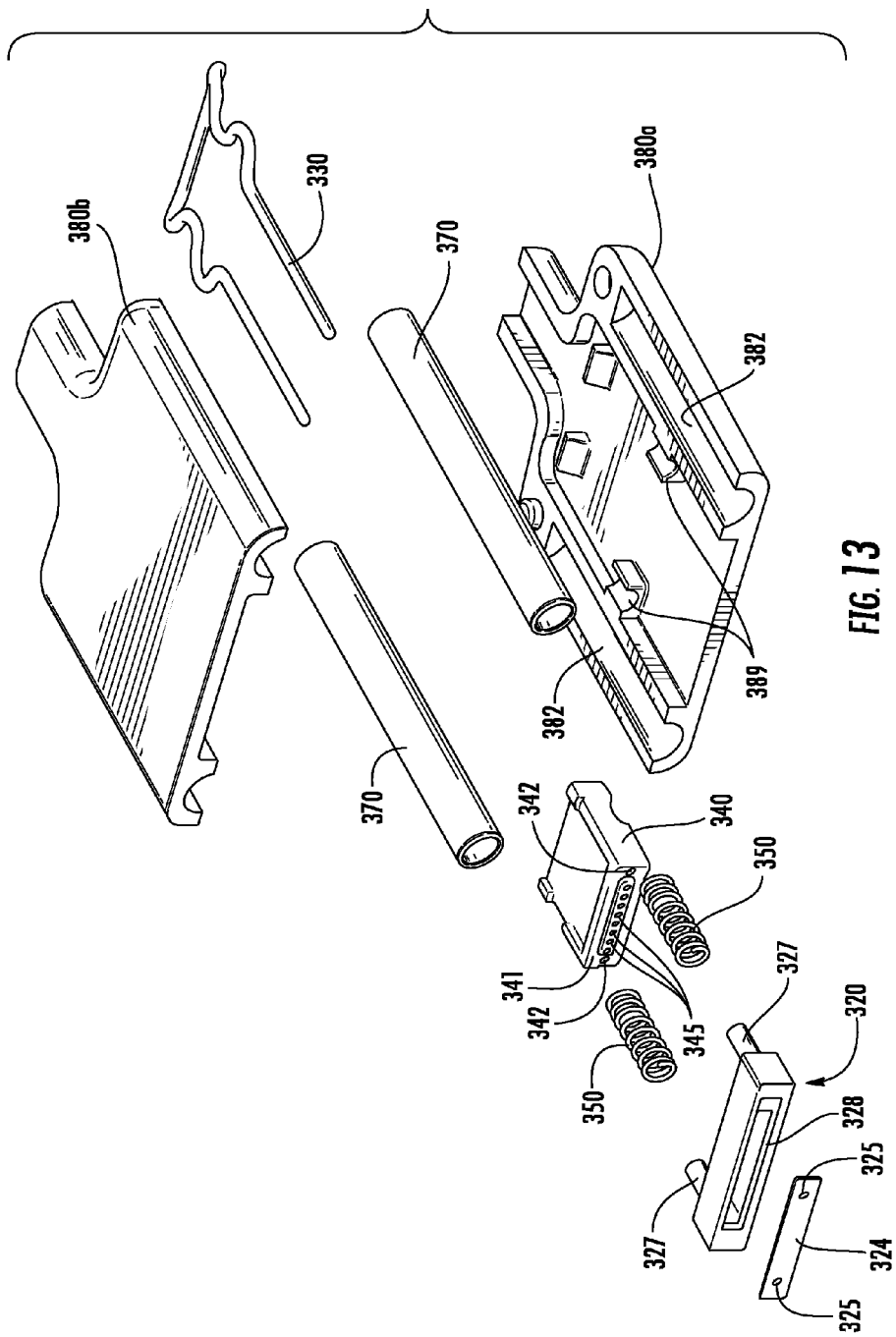
FIGS. 13 and 14 are exploded perspective views of the optical plug connector of FIGS. 9 and 10.
Figure 14:
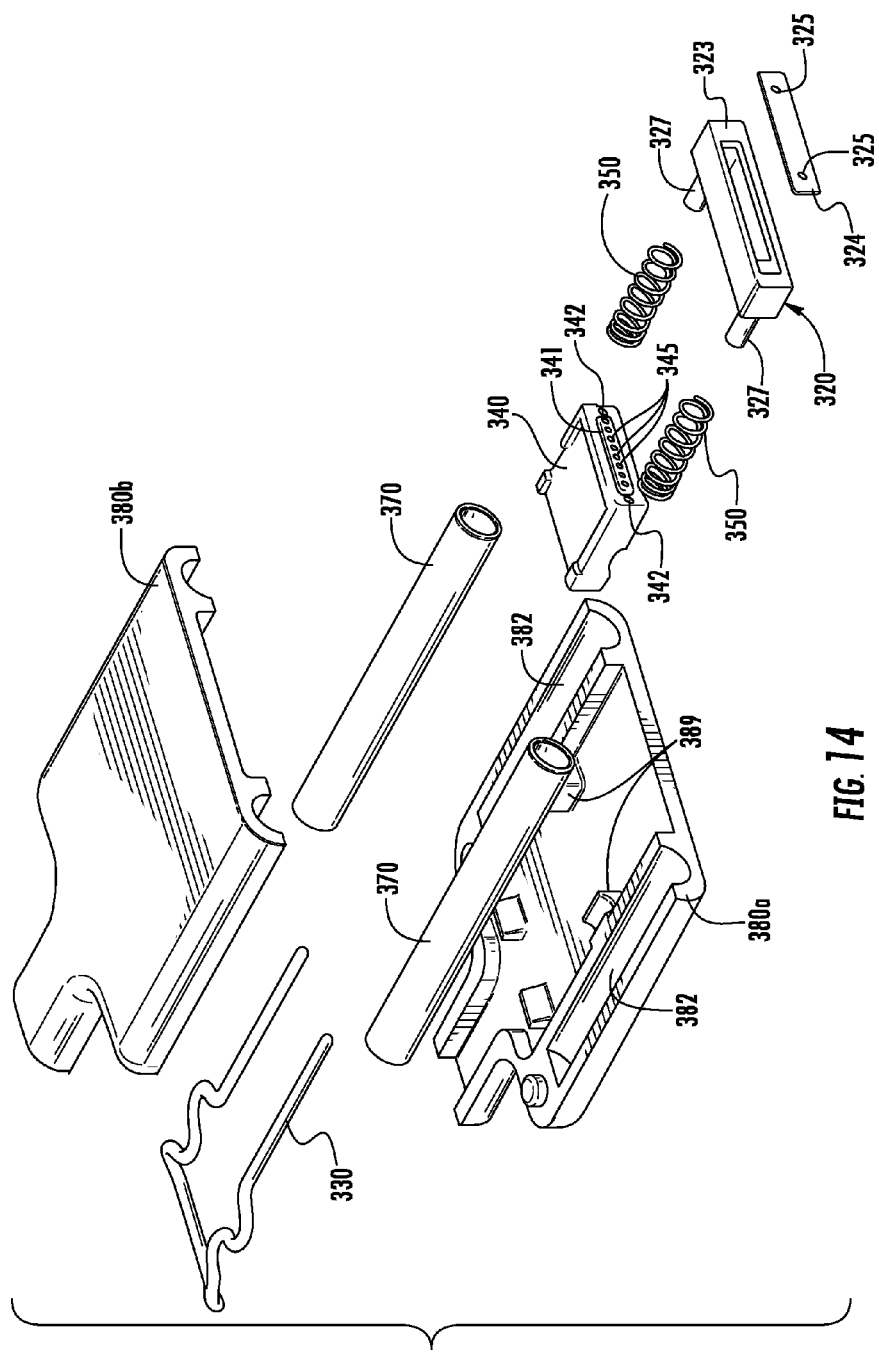

FIGS. 13 and 14 are exploded perspective views of the plug 310. Cover 320 may have any suitable configuration for the given plug design such as including body 322 and window 324 of a suitable shape, size, etc. Like plug 10, the window 324 of the connector may be formed from any suitable material such as a polymer such as Ultem® or Zeonex® or a glass such as a chemically strengthened glass such as available from Corning, Incorporated. Moreover, the window 324 may have one or more suitable coatings such as an anti-reflection coating, a scratch-resistant, multi-layer, coating etc. as disclosed herein or otherwise known. In other embodiments, the cover 320 is formed as a single component. By way of example, the cover 320 may be formed entirely from a polymer that is transmissive to the optical signals. Still other variations and modifications are possible using the concepts disclose herein.

Figure 15:
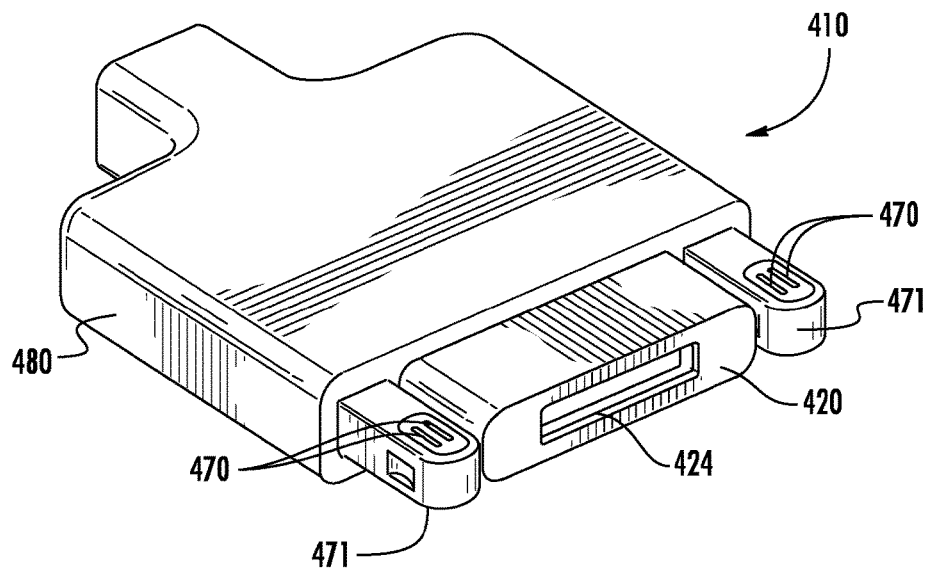
FIGS. 15 and 16 are perspective views of another optical plug connector showing the cover in the forward and retracted position and showing another type of electrical contacts.
Figure 16:
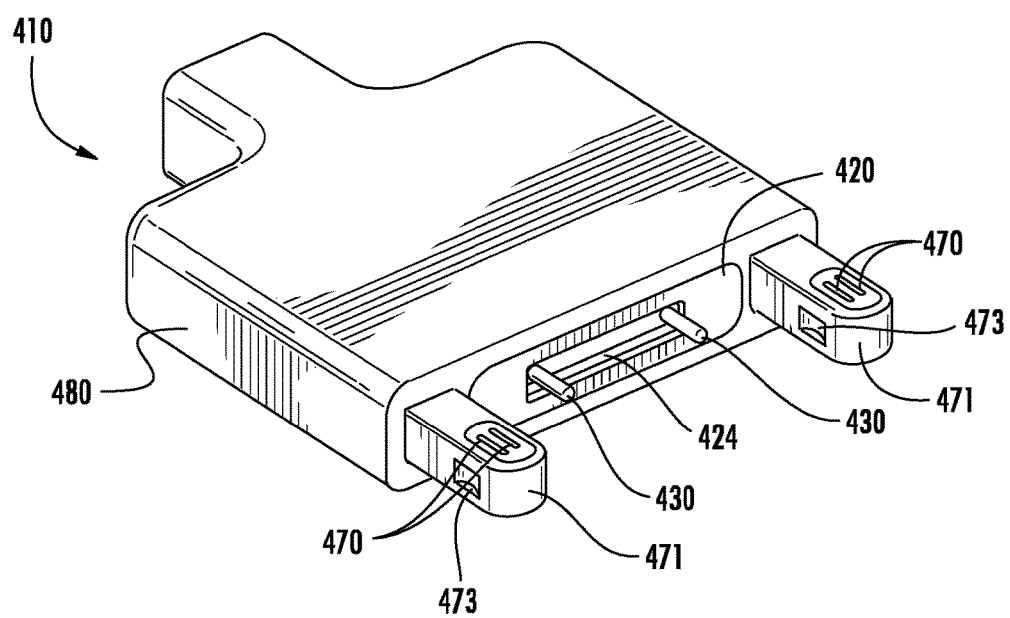

By way of example, FIGS. 15 and 16 are perspective views of another optical plug connector 410 showing the cover 420 respectively in the forward and retracted position that is similar to plug 310. As shown, plug 410 has a different style or type of electrical contacts compared with plug 310, but is otherwise similar to plug 310. In other words, plug 410 has a cover 420 for protecting the optical interface where the cover 420 can translate toward the optical interface when connecting the plug and a portion of the cover 420 allows the transmission of optical signals therethrough. Specifically, FIG. 15 is a front perspective view of plug 410 shown with the cover 420 in a forward position extending over the alignment pins 430. On the other hand, FIG. 16 shows the cover 420 of plug 410 in a retracted position with the alignment pins 430 exposed such as occurs when the plug is mated with a complimentary receptacle. When fully retracted the cover 420 is adjacent to the optical interface 12 of the optical portion 540. Like the other plugs disclosed, the optical portion of plug 410 does not translate like cover 20, but instead the optical portion may "float" for optical alignment with the complimentary receptacle. Further, the alignment pin(s) 430 extend beyond cover 420 when the cover is in the retracted position so the pins can cooperate with complimentary alignment structure on the receptacle for providing alignment of the optical channels in the optical portion. Also, the cover 420 may include a body (not numbered) and a window 424 attached to the body or the cover may be formed from a single piece using material that allows the transmission of optical signals therethrough.

Plug 410 includes electrical contacts 470 that are mounted to respective rails 471 disposed on opposite sides of the cover 420. Electrical contacts 470 are wiping contacts that may be located on one or more sides of rails 471 if desired. Rails 471 also provide coarse alignment with the complimentary receptacle along with a retention mechanism for cooperating with the receptacle when mated together. Specifically, rails 471 may include one or more detents 473 for providing a snap-fit or retention force with the complimentary receptacle. Other embodiments may include still other types of electrical contacts or arrangements or not have any electrical contacts whatsoever if desired.

Figure 17:
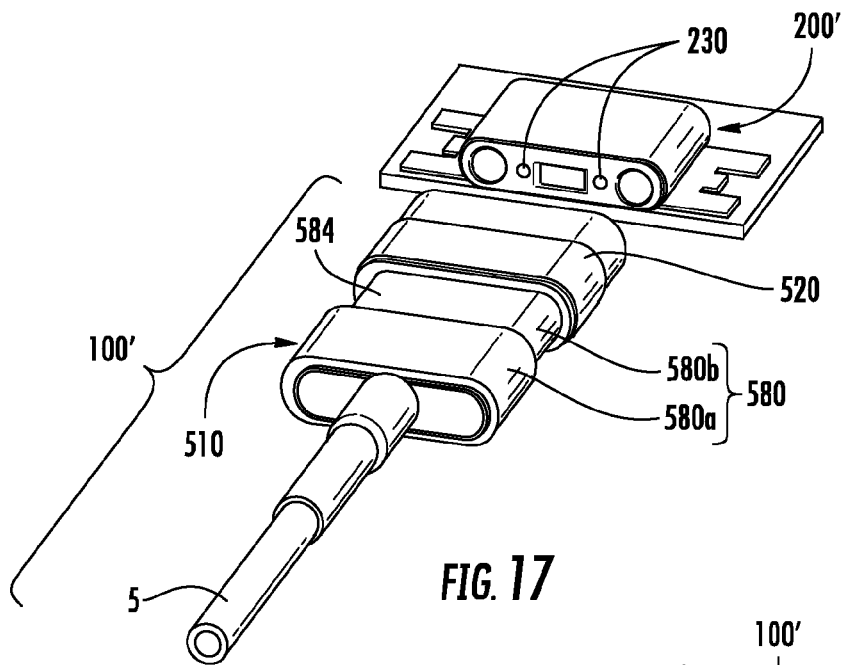
FIGS. 17 and 18 are perspective views of still another optical plug connector with a cover having a sliding fit with a portion of the housing as part of a cable assembly that is being aligned with a complimentary receptacle according to the concepts disclosed herein.
Figure 18:
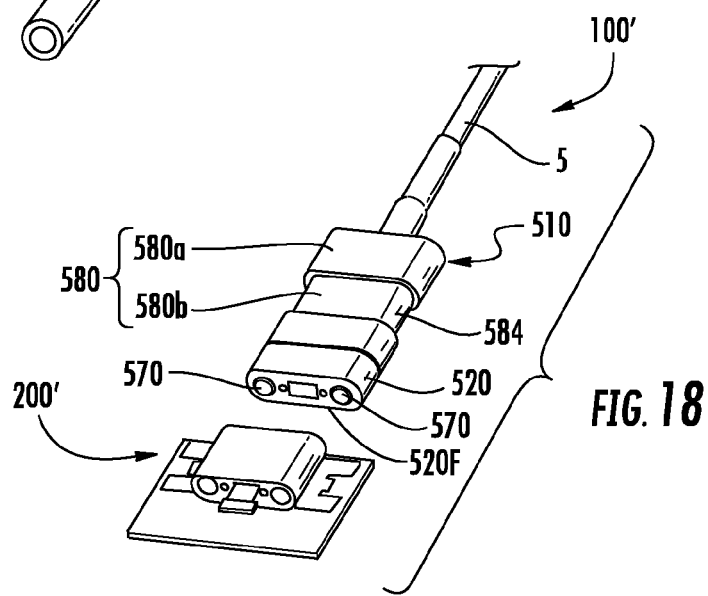

Likewise, other embodiments of the concepts disclosed can have other arrangements or geometry for the cover. For instance, other embodiments for the plug can have a cover that extends about the electrical contacts. In other words, the cover may have a front face footprint that is relatively large compared with the a cross-sectional area of the plug. FIGS. 17 and 18 are rear and front perspective views of still another cable assembly 100' having an optical plug connector 510 attached to cable 5 and depicted with its complimentary receptacle 200'. Plug 510 is similar to other plugs disclosed herein; however, the cover 520 is larger and has a sliding fit with a portion of the housing.

Figure 21:
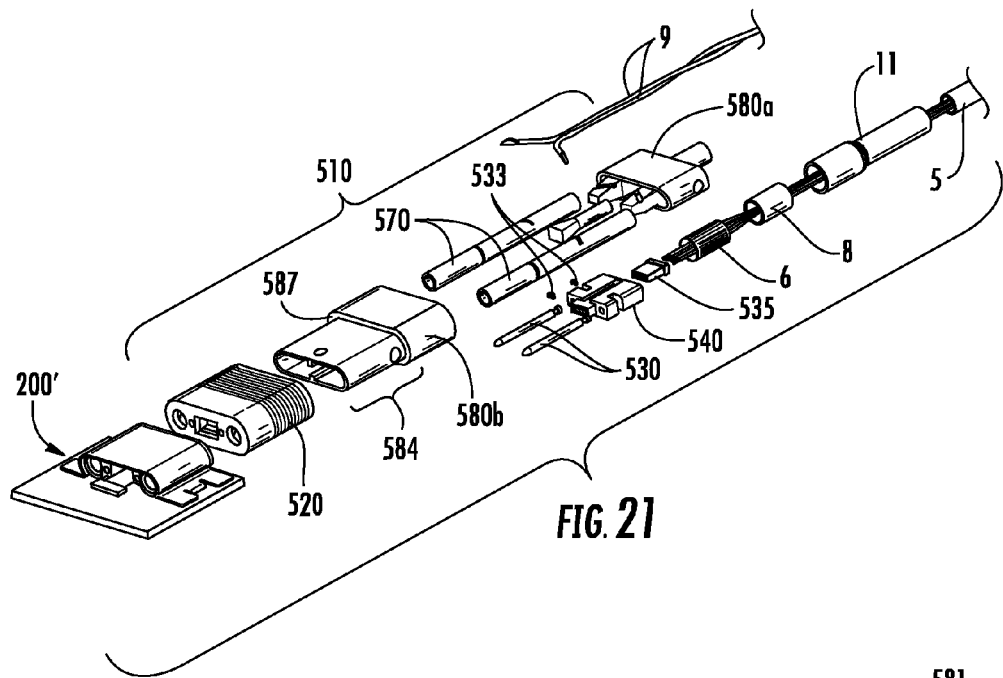
FIG. 21 is a front exploded view of the cable assembly having the optical plug connector of FIGS. 17 and 18 along with the assembled complimentary receptacle.
Figure 22:
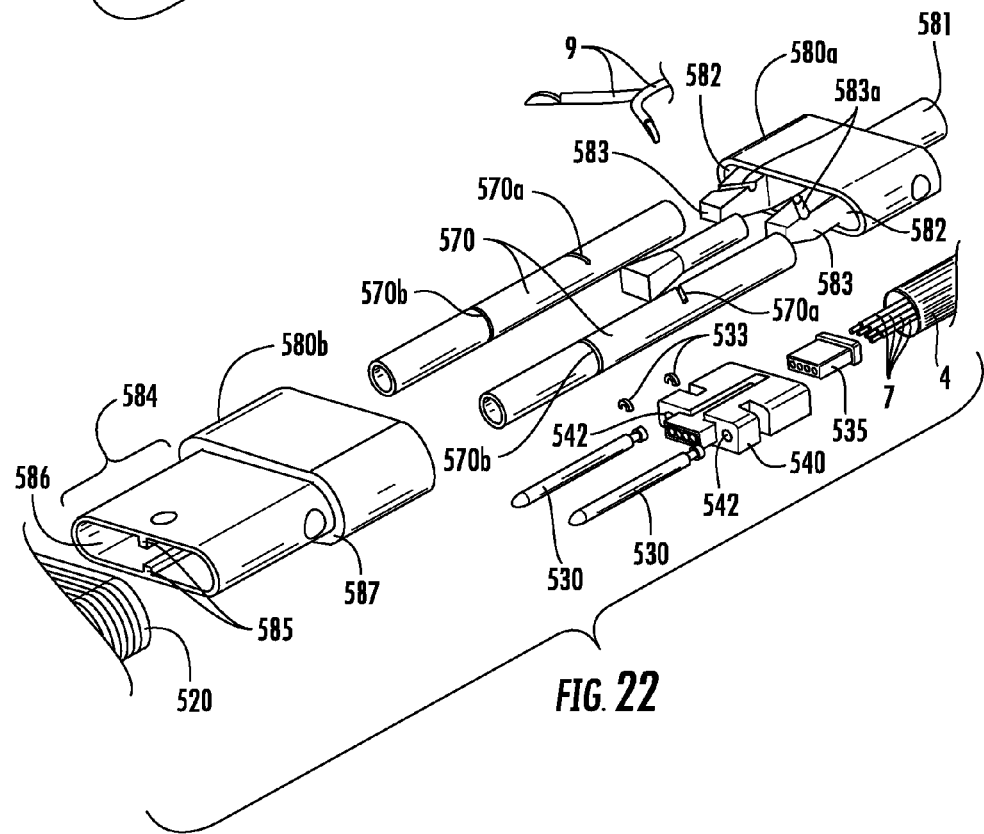
FIG. 22 is a close-up exploded view of a portion of the optical plug connector of FIG. 21.

Like the other covers, cover 520 protects the optical interface and can translate toward the optical interface when connecting the plug 510 and a portion of the cover 520 allows transmission of optical signal therethrough. Plug 510 includes a housing 580 that includes at least one guide surface 584 and a portion of the cover 520 has a sliding fit relative to a portion of housing so it may translate relative to the at least one guide surface 584 of the housing 580. In this embodiment, a portion of cover 520 fits about a portion of housing 580. Specifically, housing 580 includes a first portion 580*a* and a second portion 580*b* as best shown in FIGS. 21 and 22. More specifically, an outer surface of second portion 580*b* of housing 580 provides the guide surface 584 that has a sliding fit with an inner surface 520*a* (FIG. 27) of cover 520. Other arrangements or constructions for the housing having at least one guide surface for providing the sliding fit with the cover are possible such as shown by the plug in FIGS. 32-41.

Figure 18A:
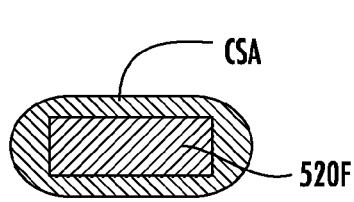
FIGS. 18A-18C are schematic representations of three different front face footprints superimposed on the cross-sectional area of plugs.
Figure 18B:
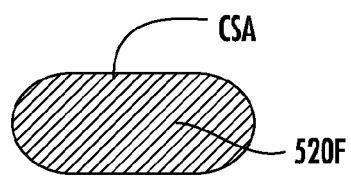
Figure 18C:
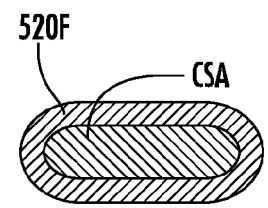

As shown in FIG. 18, the cover 520 has a front face footprint 520*f* that is disposed about electrical contacts 570. Consequently, the front face footprint 520*f* of cover 520 is a relatively large percentage of a cross-sectional area CSA of the plug 510. As used herein, the front face footprint means the area defined by the perimeter of the cover at the mating end (e.g., the front side of the cover). Additionally, the cross-sectional area CSA of the plug means the largest cross-sectional area defined by the perimeter of the plug that excludes the cover taken in a direction that is transverse to the longitudinal optical axis of the plug. FIGS. 18A-18C are schematic representations of three different front face footprints 520*f* superimposed on the cross-sectional area CSA of plugs. FIG. 18A shows front face footprint 520*f* that is smaller than the cross-sectional area CSA of the plug. For instance, the cover may have a front face footprint 520*f* that is at least 70 percent of the cross-sectional area CSA of the optical plug connector. Other embodiments may include a cover with front face footprint 520*f* that is at least 80 percent of the cross-sectional area CSA of the plug. Still other embodiments may include a cover with front face footprint 520*f* that is at least 90 percent of the cross-sectional area CSA of the optical plug connector; however, other percentages are also possible using the concepts disclosed herein. FIG. 18B is a schematic representation where front face footprint 520*f* essentially has the same cross-sectional area CSA as the plug and FIG. 18C is a schematic representation where front face footprint 520*f* is larger than the cross-sectional area CSA of the plug.

Figure 19:
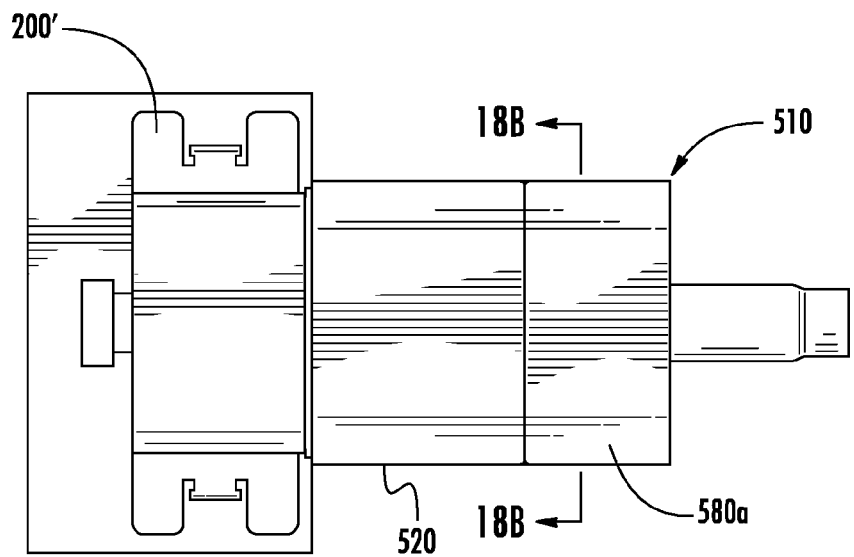
FIG. 19 is a top view of the optical plug connector and the complimentary receptacle of FIGS. 17 and 18 shown mated together.
Figure 20:
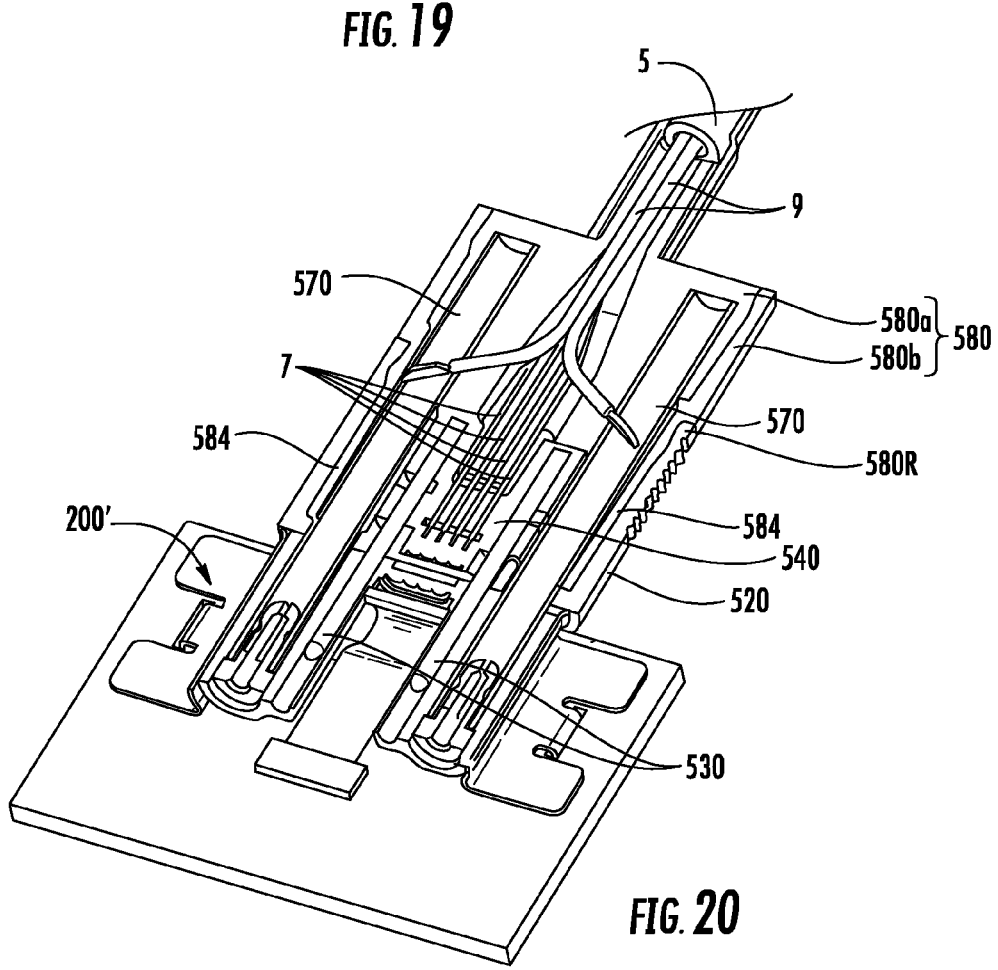
FIG. 20 is a sectional view of the mated optical plug connector and the complimentary receptacle of FIG. 19.

FIG. 19 is a top view of plug 510 and the complimentary receptacle 200' mated together and FIG. 20 is a sectional view of plug 510 and the complimentary receptacle 200' mated together. As depicted, the cover 520 is slid backwards relative to the housing 580 and is in a fully retracted position so that cover 520 is adjacent to the first portion 580*a* of housing 580. Stated another way, cover 520 has a sliding fit relative to the second portion 580*b* of the housing 580 and translates relative to the guide surface 584 of the housing. Specifically, a portion of cover 520 fits about a portion of housing 580 and more specifically, cover 520 fits about the second portion 580*b* of housing 580. Cover 520 "oversleeves" the second portion 580*b* of housing 580 since its inner surface of the cover 520 slides over the outer barrel of the second portion 580*b*. In this particular embodiment, the front face footprint 520*f* of cover 520 has about the same area as the cross-sectional area CSA of the optical plug connector 510 (i.e., about 100 percent since they have the same area) as best shown in FIG. 19 such as represented in FIG. 18b.

FIG. 21 is an exploded view of the cable assembly 100' having plug 510 and cable 5 along with the assembled complimentary receptacle 200' and FIG. 22 is a close-up exploded view of a portion of plug 510. Plug 510 includes cover 520, one or more alignment pins 530, an optical portion 540, one or more electrical contacts 570, and housing 580. In this embodiment, plug 510 uses two alignment pins 530 that are secured to the optical portion 540 using optional pin retainers 533. Optical portion 540 includes respective bores 542 for receiving alignment pins 530 along with pockets 544 that intersect bores 542 as shown. During assembly the alignment pins 530 are inserted into respective bores 542 until the grooves (not numbered) of the alignment pins 530 are exposed in pockets 544 so that the pin retainers 533 can be secured to the grooves of the alignment pins 530. However, other arrangements are possible for the alignment pins such as using a monolithic alignment pin instead of two alignment pins. Further, the one or more alignment pins may be secured in any suitable manner such as an interference fit, using an adhesive, etc.

The electrical contacts 570 in this embodiment are illustrated as round electrical contacts. Specifically, electrical contacts 570 are tubular electrical contacts, but they may have other geometries such as being solid or other known types. When assembled, this embodiment has a portion of each electrical contact 570 received into a respective portion of the housing 580. Electrical contacts 570 may also include one or more optional notches. By way of example, electrical contacts 570 have a first notch 570a for electrically attaching electrical conductors 9 of cable 5. Electrical contacts 570 may have a second notch 570b that acts as a predetermined weak point for the electrical contacts 570 in the event of a catastrophic event to provide a predetermined weak point. Unlike other embodiments that sandwich the electrical contacts between portions of the housing, plug 510 has the electrical contacts 570 received and secured in a first portion 580a of housing 580. Specifically, first portion of housing 580a has one or more passages 582 appropriately sized for receiving the electrical contacts 570. The electrical contacts 570 may be secured in the first portion 580a using any suitable method such as a mechanical attachment, an adhesive or other suitable method.

Besides receiving the electrical contacts, the first portion of housing 580a includes a barrel portion 581 at the rear portion that has a passageway (not numbered) that extends to the front end for receiving communication and/or power elements of cable 5. Barrel portion 581 may be sized so that optional strength members 4 such as aramid yarns or fiberglass members of cable 5 may be strain-relieved thereto using a crimp band 8 as desired. First portion 580a of housing 580 may also include one or more optional supports 583 extending from a front end of the first portion. As depicted, supports 583 are on opposite sides of the passageway (not numbered) of the first portion 580a. Supports 583 may serve one or more purposes depending on the design and needs. For instance, supports 583 may include one or more wire routing guides 583a for providing a defined path for respective electrical conductors 9 to route to electrical contacts 570. Supports 583 may also have a shape adjacent to passages 582 for aiding the securing of the electrical contacts 570 to the first portion 580a by providing a larger surface area on the housing for securing the electrical contacts 570. In other words, supports 583 may include scallops having a shape that is complimentary to the electrical contacts 570 adjacent to the contacts for increasing the surface area contact between the first housing portion 580a and the respective electrical contacts 570. Consequently, more surface area is available for providing a mechanical fit or as an adhesive surface for securing the electrical contacts 570.

Figure 23:
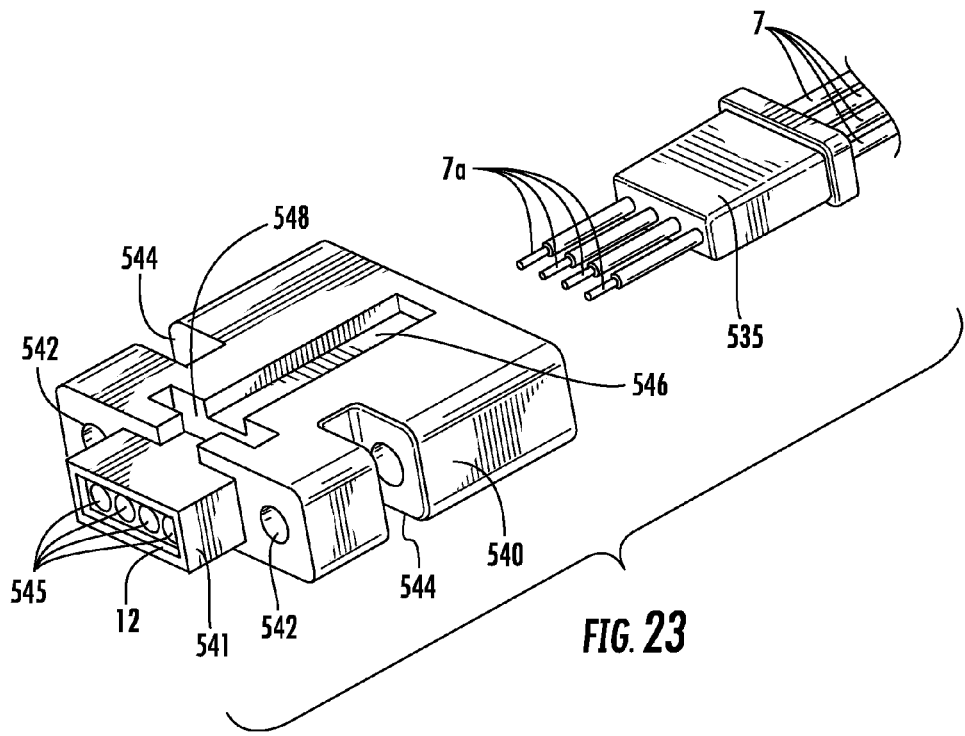
FIG. 23 is a partially assembled view showing the optical fibers disposed in the fiber organizer and positioned for insertion into the optical portion.

FIG. 23 is a partially assembled view showing the optical fibers 7 disposed in the fiber organizer 535 and the sub-assembly positioned for insertion into a rear end of the optical portion 540. As depicted, optical fibers 7 are inserted into respective bores of the fiber organizer 535 and secured in place so that the optical fiber ends 7a extend beyond the front face of the fiber organizer 535. Fiber organizer 535 may also act as a fixture for stripping and cleaving the optical fibers ends 7a to the desired length. Stated another way, once optical fibers 7 are secured to the fiber organizer 535 with an excess length extending beyond the front end, then the fiber coating may be stripped from the optical fiber ends 7a over a suitable length and thereafter the optical fiber ends 7a may be cleaved to the desired length to cooperate with the optical portion 540 when assembled. Any suitable method may be used for stripping and cleaving the ends of the optical fibers 7 such as mechanical, laser or thermal stripping; likewise, the cleaving may be mechanical or laser cleaving as desired. Once the optical fiber ends 7a are secured and processed, then the fiber organizer sub-assembly may be attached to the optical module 540 so optical fibers 7 are in optical communication with lenses 545. Using the fiber organizer 535 makes it easier to maintain uniform lengths among the optical fiber ends extending from the front end of the fiber organizer 535. Since the fiber organizer 535 does not transmit optical signals it may be formed from many different suitable materials such as a polymer that may or may not be transparent. In one embodiment, the fiber organizer 535 is formed from a translucent material that allows UV curing for securing the optical fibers 7 thereto.

On the other hand, optical portion 540 has an optical interface 12 that includes a plurality of lenses 545 and may use a material having suitable optical properties if the lenses are molded therein. In other embodiments, individual GRIN lenses may be disposed in the optical portion 540 in a suitable manner such as placing the GRIN lenses into bores or channels. FIGS. 28 and 29 are top and bottom perspective views of the optical portion 540 to show further detail. As best shown in FIG. 20, the plurality of lenses 545 are in optical communication with a plurality of fiber bores (not numbered) in the optical portion 540 that receive the optical fiber ends 7a that extend beyond the fiber organizer 535 when assembled. Optical portion 540 may also include one or more keyways 546 (FIG. 23) for cooperating with a portion of housing 580. In this embodiment, optical portion 540 includes two keyways 546 on disposed on opposite sides of the optical portion 540. Keyways 546 cooperate with keys 585 on the second portion 580b of housing 580 such as shown in FIG. 22. Optical portion 540 includes a well 548 at a medial portion. Well 548 extends at least to the bores or passageways that receive the optical fibers 7 and is used for aligning the optical fiber ends 7a to the appropriate optical channels of the optical portion 540 and to receive an adhesive for securing the optical fibers 7 in the optical portion 540.

As shown, optical portion 540 has a nose 541 that is disposed between bores 542 that receive alignment pins 530. Nose 541 includes the optical interface 12 and lenses 545. When plug 510 is assembled, the optical portion 540 is aligned with a cavity 521 (FIG. 27) at a rear of cover 520. When cover 520 moves rearward toward a retracted position, the nose 541 engages the forward portion of cavity 521 of cover 520. Thus, when the cover 520 is in the retracted position the window 524 of cover 520 is in close proximity to the optical interface 12 of the optical portion 540 for allowing the transmission of optical signals through the window 524 and to/from optical interface 12.

Figure 24:
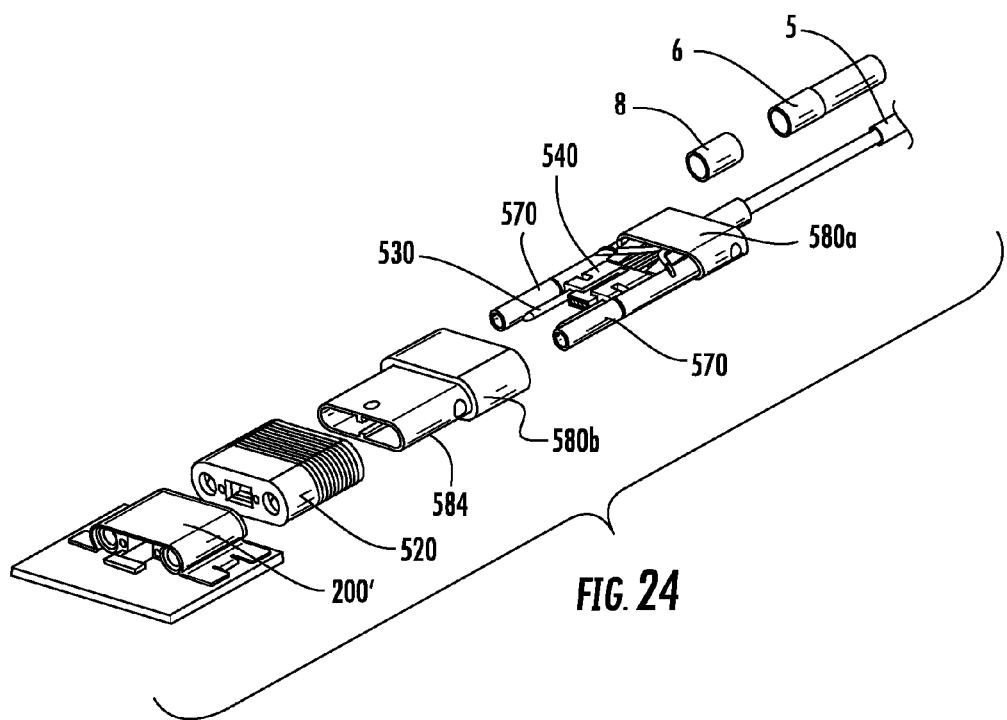
FIG. 24 is another partially assembled view showing the optical plug connector along with the assembled complimentary receptacle.
Figure 25:
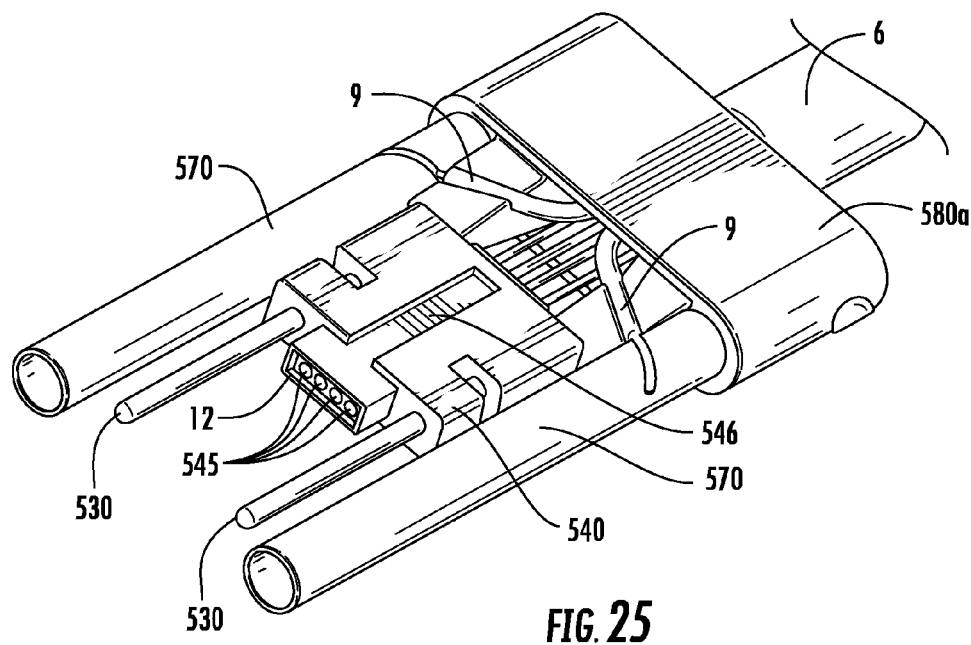
FIG. 25 is a close-up view showing the sub-assembly of FIG. 24.

FIG. 24 is a partially assembled view of plug 510 along with an assembled receptacle 200'. The partially assembled view of plug 510 has the second portion 580*b* of housing 580 and cover 520 removed and FIG. 25 is a close-up view showing the partially assembled sub-assembly of FIG. 24. The sub-assembly has the electrical contacts 570 attached to the first housing portion 580*a* with the electrical conductors 9 electrically attached thereto along with the optical portion 540 having alignment pins 530 secured thereto. As shown in FIG. 24, the second portion 580*b* of housing 580 is aligned with the sub-assembly so that the electrical contacts 570 may be received in a passageway 586 (FIGS. 30 and 31) of second portion 580*b* and keys 585 at a front end 580F cooperate with keyways 546 of optical portion 540 when assembled. As best shown in FIG. 20, a rear end 580R of the second portion 580*b* of housing 580 fits about the first portion 580*a* such as with a friction or snap-fit, but an adhesive may also be used if desired. FIGS. 30 and 31 are front and rear perspective views of first portion 580*b* of housing 580 depicting details of the second portion 580*b*. For instance, as viewed from the rear end 580R, the second portion 580*b* has a stepped inner surface (not numbered) with the larger portion fitting about the first portion 580*a* of housing 580 along with an internal shoulder (not numbered) that acts as a stop surface. Additionally, second portion 580*b* of housing 580 has an outer surface that includes a shoulder 587 that provides the transition from the guide surface 584 to an outer body part of the second portion 580*b*, but other housing arrangements using the concepts disclosed are possible. Shoulder 587 on the outer surface also acts as a stop from the translation of cover 520. Cover 520 may be assembled to second portion 580*b* of housing 580 so that it has a sliding fit on guide surface 584 and may translate between forward and retracted positions during mating.

Figure 26:
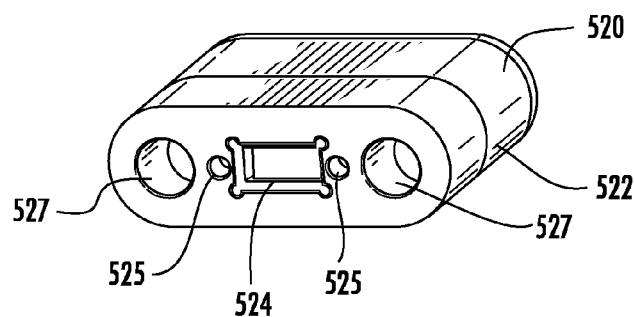
FIGS. 26 and 27 are front and rear perspective views of the cover of the optical plug connector of FIGS. 17 and 18.
Figure 27:
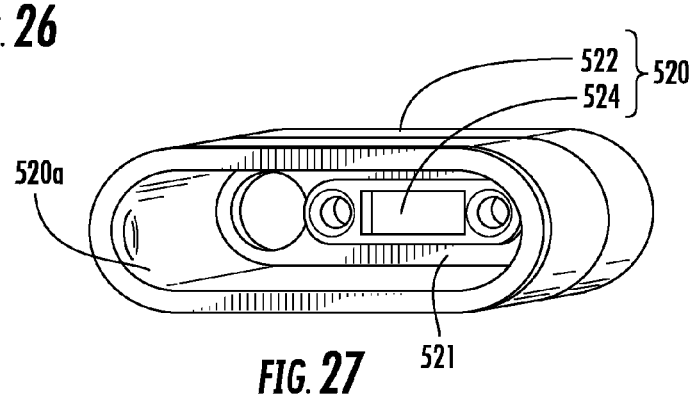

More specifically, FIGS. 26 and 27 are front and rear perspective views of the cover 520. Like the other embodiments, cover 520 protects the optical interface 12 from dirt, debris and contact, etc. when in both the extended position and retracted position. By way of example, cover 520 may include a body 522 and a window 524 attached to the body 522 where the window 524 allows the transmission of optical signals therethrough. Further, cover 520 may be inspected or cleaned by the user as desired and may even be removed and replaced if desired. Cover 520 has a sliding fit between an inner surface of cavity 521 and guide surface 584 and may translate from the extended position to the retracted position and may include one or more cover guides. Further, the cover 520 may include one or more detents on an inner surface 520*a* of cover 520. As discussed above, cover guides may be any suitable structure disposed on any suitable component such as grooves, protrusions or rails disposed on a housing 580 and/or cover 520, recesses or bores located on cover 520, electrical contacts, alignment pins, etc. as desired. This embodiment has several cover guides for guiding the translation of the cover 520. First, plug 510 includes cover guides configured as one or more alignment pins 530 that cooperate with cover 520 that includes one or more bores 525 for receiving the alignment pins 30 as best shown in FIGS. 26 and 27. Although, alignment pins 530 are also used for alignment of the optical interface 12, bores 525 of cover 520 need not have a precision fit with the alignment pins 530 since the translation of cover 520 does not impact optical alignment of the plug 510. In other words, a clearance fit between the alignment pins 530 and bores 525 is possible since other structure is used for guiding the translation of the cover 520. When cover 520 is in the retracted position the one or more alignment pins 530 extend forward of the cover 520 and may be used for aligning the optical interface 12 of plug 510 with receptacle 200 by cooperating with one or more bores 230. Likewise, cover 520 includes a second set of bores 527 that are sized so that electrical contacts 570 may be received therethrough and extend beyond cover 520 during mating. Bores 527 may be sized as desired with respect to the electrical contacts 570 such as oversized so as to eliminate any friction forces.

Figure 32:
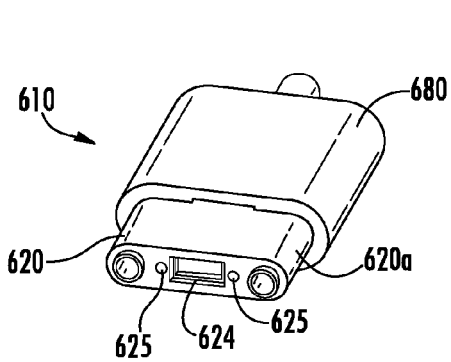
FIGS. 32 and 33 are perspective views of another optical plug connector showing the cover in the forward and retracted position where the cover has a sliding fit with a portion of the housing according to the concepts disclosed herein.
Figure 33:
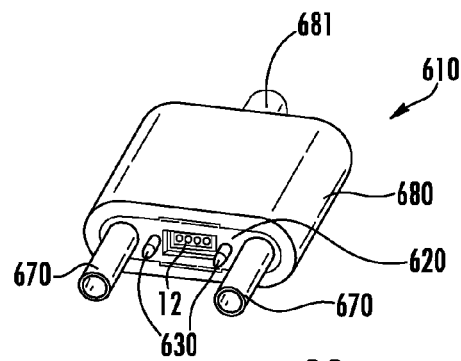
Figure 34:
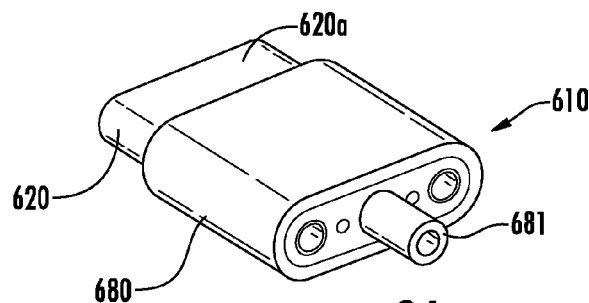
FIG. 34 is a rear perspective view of the optical plug connector of FIGS. 32 and 33.

Other plug constructions similar to plug 510 are possible. For instance, a plug could have a cover that disappears into a portion of the housing such as being received into an end portion of the housing; instead of being "oversleeved" such as plug 510. Illustratively, FIGS. 32 and 33 are perspective views of another plug 610 that is similar to plug 510 showing the cover 620 respectively in the forward and retracted position where the cover 620 has a sliding fit with a portion of the housing 680 according to the concepts disclosed herein. As best shown in FIG. 33, cover 620 is received into an end portion of housing 680 when in the retracted position. FIG. 33 shows cover 620 of plug 610 in a retracted position with the alignment pins 630 exposed such as occurs when the plug is mated with a complimentary receptacle. When fully retracted the cover 620 is adjacent to the optical interface 12 of the optical portion 640. Like the other plugs disclosed, the optical portion of plug 610 does not translate like cover 620, but instead the optical portion may "float" for optical alignment with the complimentary receptacle. Further, the alignment pin(s) 630 extend beyond cover 620 when the cover is in the retracted position so the pins can cooperate with complimentary alignment structure on the receptacle for providing alignment of the optical channels in the optical portion. Also, the cover 620 may include a body (not numbered) and a window 624 (FIG. 38) attached to the body or the cover may be formed from a single piece using material that allows the transmission of optical signals therethrough. Plug 610 also includes alignment features 670 disposed on opposite sides of the cover 420. As shown, cover 620 fits about the alignment features 670. Alignment features 670 provide coarse alignment with the complimentary receptacle and may act as a retention mechanism for cooperating with the receptacle when mated together. In other embodiments, the alignment features 670 may be configured as electrical contacts if desired by using a suitable material and electrically attaching electrical conductors 9. FIG. 34 is a rear perspective view of plug 610.

Figure 35:
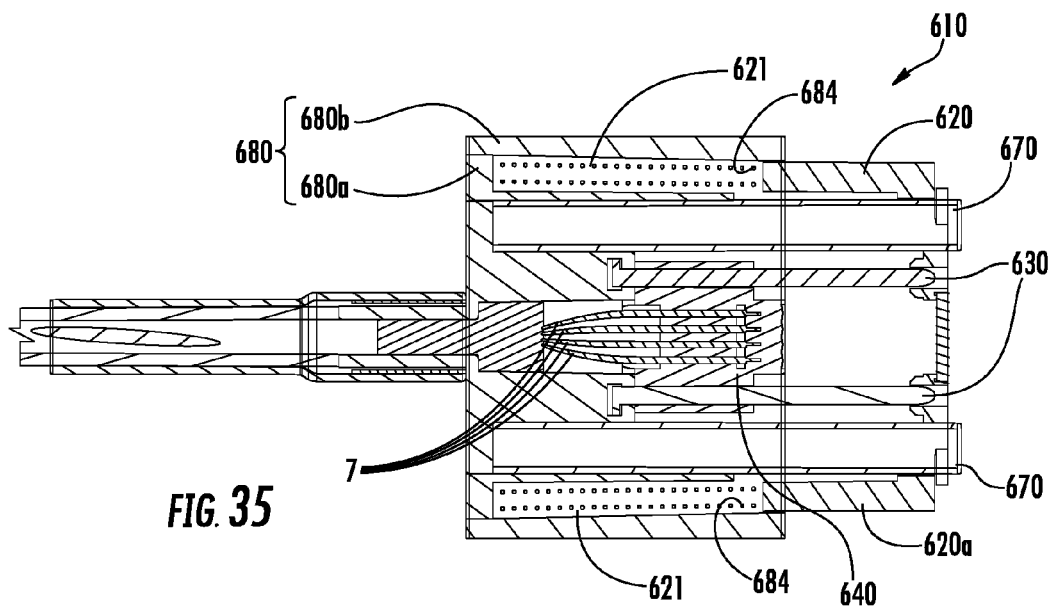
FIG. 35 is a cross-sectional view showing the optical plug connector of FIGS. 32 and 33.
Figure 36:
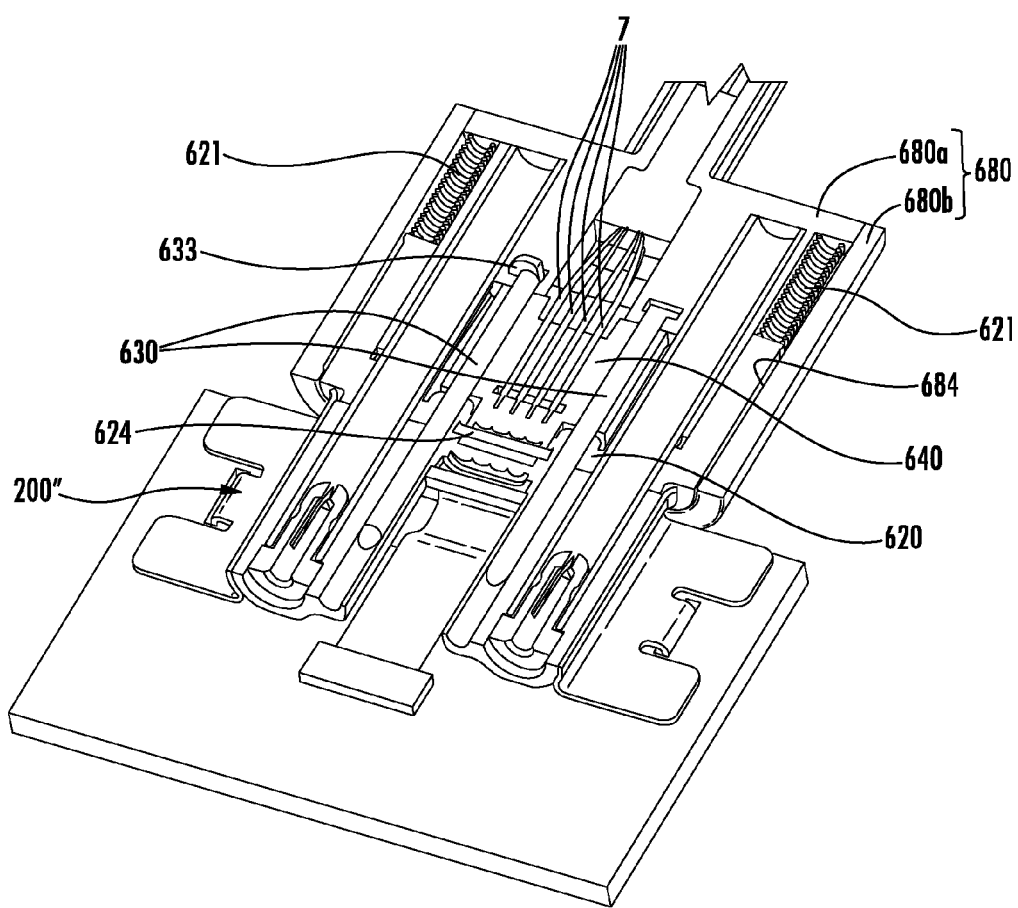
FIG. 36 is a cross-sectional view showing the optical plug connector of FIGS. 32 and 33 mated with a complimentary receptacle.

FIG. 35 is a cross-sectional view showing details of plug 610 and FIG. 36 is a cross-sectional view showing the plug 610 mated with a complimentary receptacle 200". Like cover 520, cover 620 protects the optical interface 12 and can translate toward the optical interface when connecting the plug 610 and a portion of the cover 620 allows transmission of optical signal therethrough. Plug 610 includes a housing 680 that includes at least one guide surface 684 and a portion of the cover 620 has a sliding fit relative to a portion of housing so it may translate relative to the at least one guide surface 684 of the housing 680. In this embodiment, a portion of cover 620 is received into an end portion of housing 680. Specifically, housing 680 includes a first portion 680*a* and a second portion 680*b*. More specifically, an inner surface of second portion 680*b* of housing 680 provides the guide surface 684 that has a sliding fit with an outer surface 620a of cover 620. As depicted, cover 620 is biased forward by resilient members 621 that are disposed between a portion of housing 680 and cover 620 and cover 620 compresses the resilient members 621 when in the retracted position such as shown in FIG. 36.

Figure 37:
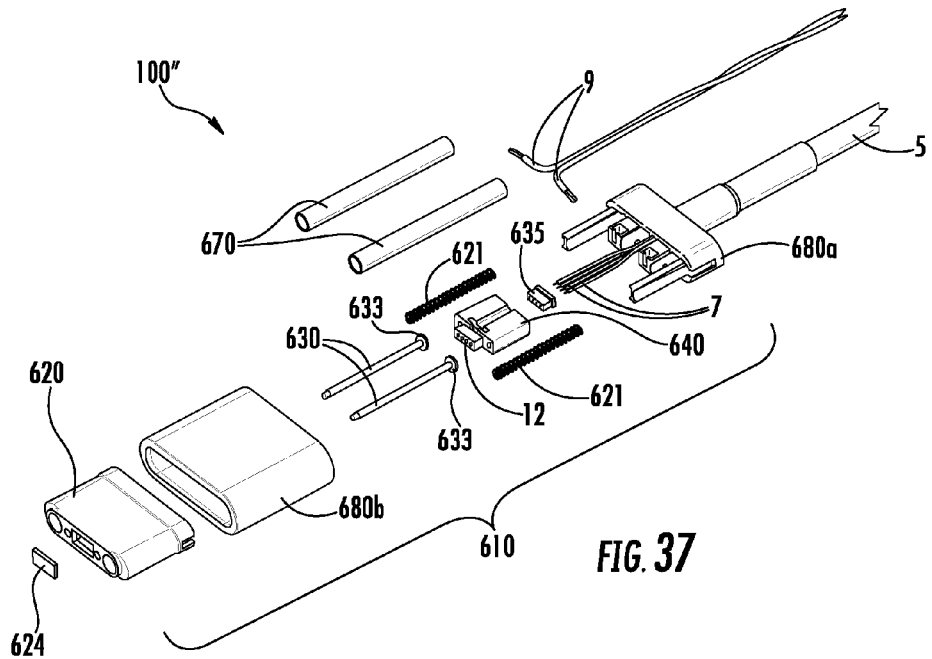
FIG. 37 is a partially exploded view of the optical plug connector of FIGS. 32 and 33.
Figure 38:
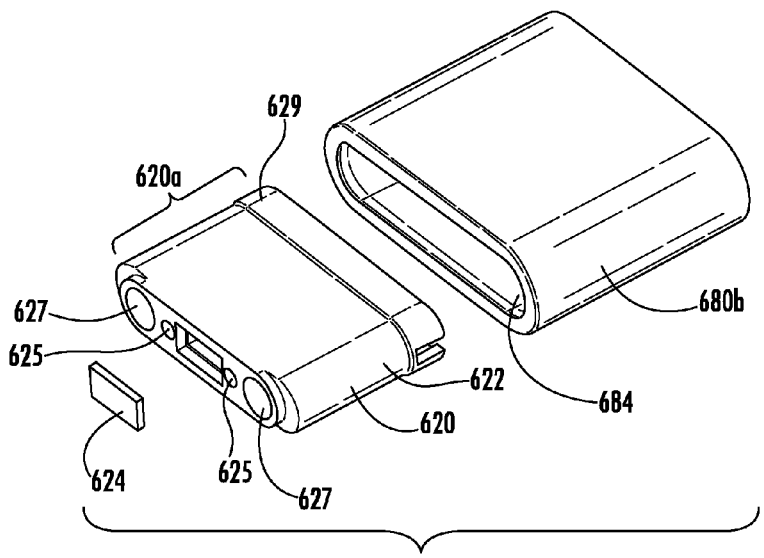
FIG. 38 is a view of the cover and a portion of the housing of the optical plug connector of FIGS. 32 and 33.

FIG. 37 is a partially exploded view of plug 610 as a portion of a cable assembly 100" having cable 5 and FIG. 38 is a detailed view of the cover 620 and the second portion 680b of housing 680. As shown, plug 610 includes cover 620, one or more resilient members 621, one or more alignment pins 630, a fiber organizer 635, an optical portion 640, one or more alignment features 670, and housing 680. Further, cable 5 is shown attached to the first portion 680a of housing 680 with the optical fibers extending therethrough and the toward the front of the plug 610.

Like the other embodiments, cover 620 protects the optical interface 12 from dirt, debris and contact, etc. when in both the extended position and retracted position. By way of example, cover 560 may include a body 622 and a window 624 attached to the body 622 where the window 624 allows the transmission of optical signals therethrough. As with other covers, cover 620 may be inspected or cleaned by the user as desired and may even be removed and replaced if desired. Cover 620 has a sliding fit between an outer surface and a guide surface 684 of the second portion 680b of housing 680 and may translate from the extended position to the retracted position and may include one or more cover guides. Further, the cover 620 may include a shoulder 629 disposed adjacent an outer surface 620a of cover 620 that acts as a stop; however, other suitable structures are possible. As discussed above, cover guides may be any suitable structure disposed on any suitable component such as grooves, protrusions or rails disposed on a housing and/or cover, recesses or bores located on cover, electrical contacts, alignment pins or alignment features, etc. as desired. Cover 620 includes bores 525 for receiving alignment pins 630 and a second set of bores 627 that are sized so that alignment features 670 may be received therethrough and extend beyond cover 620 during mating. The bores 625,627 of cover 620 may be sized as desired.

Figure 39:
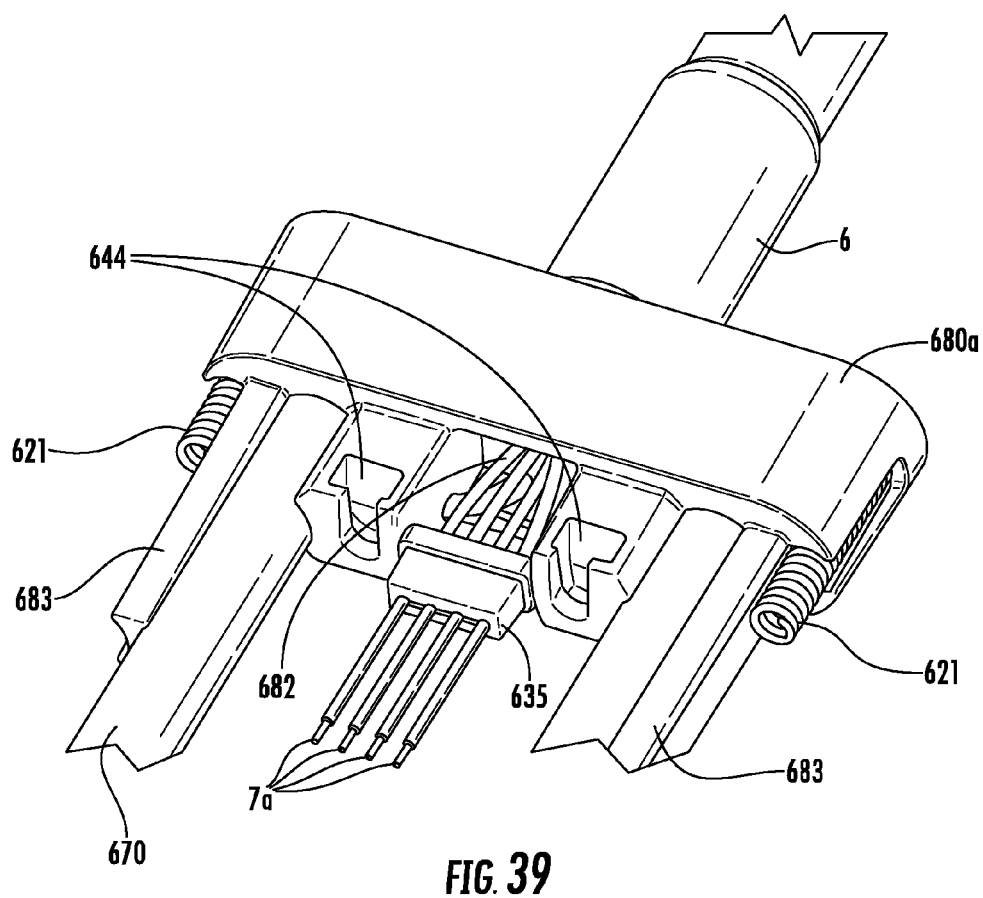
FIG. 39 is a partially assembled view of the optical plug connector of FIGS. 32 and 33.
Figure 40:
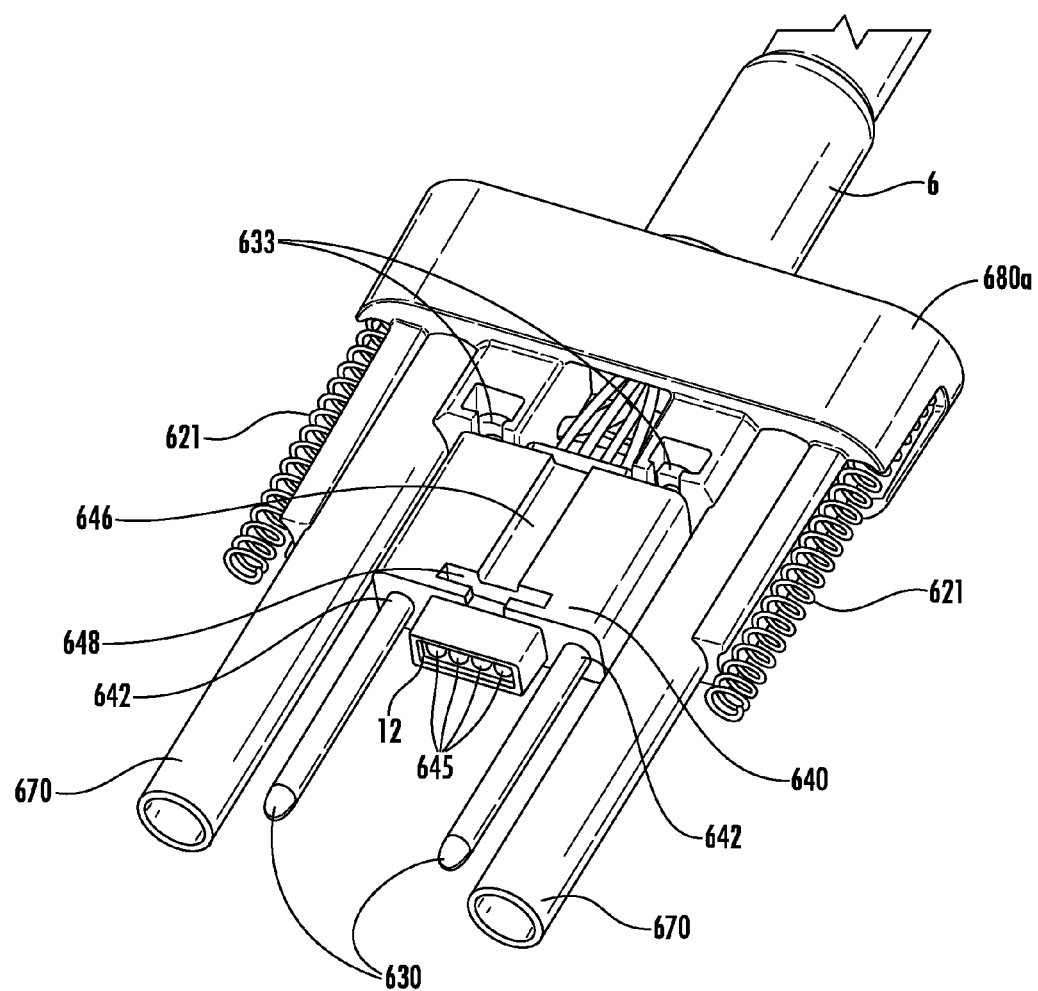
FIG. 40 is a partially assembled view of the optical plug connector of FIGS. 32 and 33 with the cover and a portion of the housing removed.

FIGS. 39 and 40 depict partially assembled views of plug 610. As shown, the the optical fibers 7 disposed in the fiber organizer 635 and secured in a suitable manner such as discussed herein. Specifically, optical fibers 7 are inserted into respective bores of the fiber organizer 635 and secured in place so that the optical fiber ends 7a extend beyond the front face of the fiber organizer 635. Stated another way, once optical fibers 7 are secured to the fiber organizer 535 with an excess length extending beyond the front end, then the fiber coating may be stripped from the optical fiber ends 7a over a suitable length and thereafter the optical fiber ends 7a may be cleaved to the desired length to cooperate with the optical portion 640 when assembled. Once the optical fiber ends 7a are secured and processed, then the optical fibers 7 may be inserted into the optical module 640 so the fiber ends 7a are in optical communication with lenses 645 as best shown in FIG. 40.

Besides receiving the alignment features 670, the first portion of housing 680a includes a barrel portion 681 at the rear portion that has a passageway (not numbered) that extends to the front end for receiving communication and/or power elements of cable 5. Barrel portion 681 may be sized so that optional strength members 4 such as aramid yarns or fiberglass members of cable 5 may be strain-relieved thereto using a crimp band as desired and an optional boot that may attached over the structure. First portion 680a of housing 680 may also include one or more optional supports 683 extending from a front end of the first portion. As depicted, supports 683 are on opposite sides of the passageway (not numbered) of the first portion 680a. Supports 683 may serve one or more purposes depending on the design and needs. Supports 683 may also have a shape adjacent to passages 682 for aiding the securing of the alignment features 670 to the first portion 680a by providing a larger surface area on the housing. In other words, supports 683 may include scallops having a shape that is complimentary to the alignment features 670. Consequently, more surface area is available for providing a mechanical fit or as an adhesive surface for securing the alignment features 670. Supports 683 also have scallops on the outboard side that are complimentary to the shape of the resilient members 621. Resilient members 621 are received in the outboard bores (not numbered) of first portion 680a of housing 680 as best shown in FIG. 39.

FIG. 40 is a partially assembled view showing the plug 610 with the cover 620 and the second portion 680b of the housing removed and the optical module 640 having alignment pins 630 attached to the sub-assembly. In this embodiment, plug 610 uses two alignment pins 630 that align the optical portion 640 and are secured to first portion 680a of housing 680 using pin retainers 633 that are integrally formed with alignment pins 630. Optical portion 640 includes respective bores 642 for receiving alignment pins 630. During assembly the alignment pins 630 are inserted into respective bores 642 and the pin retainers 633 are disposed in pockets 644 (FIG. 39) of the first portion 680a of housing 680. However, other arrangements are possible for the alignment pins such as using a monolithic alignment pin instead of two alignment pins. Further, the one or more alignment pins may be secured in any suitable manner such as an interference fit, using an adhesive, etc.

Optical portion 640 may also include one or more keyways 646 for cooperating with a portion of housing 680. In this embodiment, optical portion 640 includes two keyways 646 on disposed on opposite sides of the optical portion 640. Keyways 646 cooperate with keys (not visible) on the second portion 680b of housing 680. Optical portion 640 also includes a well 648 at a medial portion. Well 648 extends at least to the bores or passageways that receive the optical fibers 7 and is used for aligning the optical fiber ends 7a to the appropriate optical channels of the optical portion 640 and the will 648 may receive an adhesive for securing the optical fibers 7 in the optical portion 640. Thereafter, the second portion 680b of housing 680 and cover 620 may be attached about the first portion 680a of housing 680.

Figure 41:
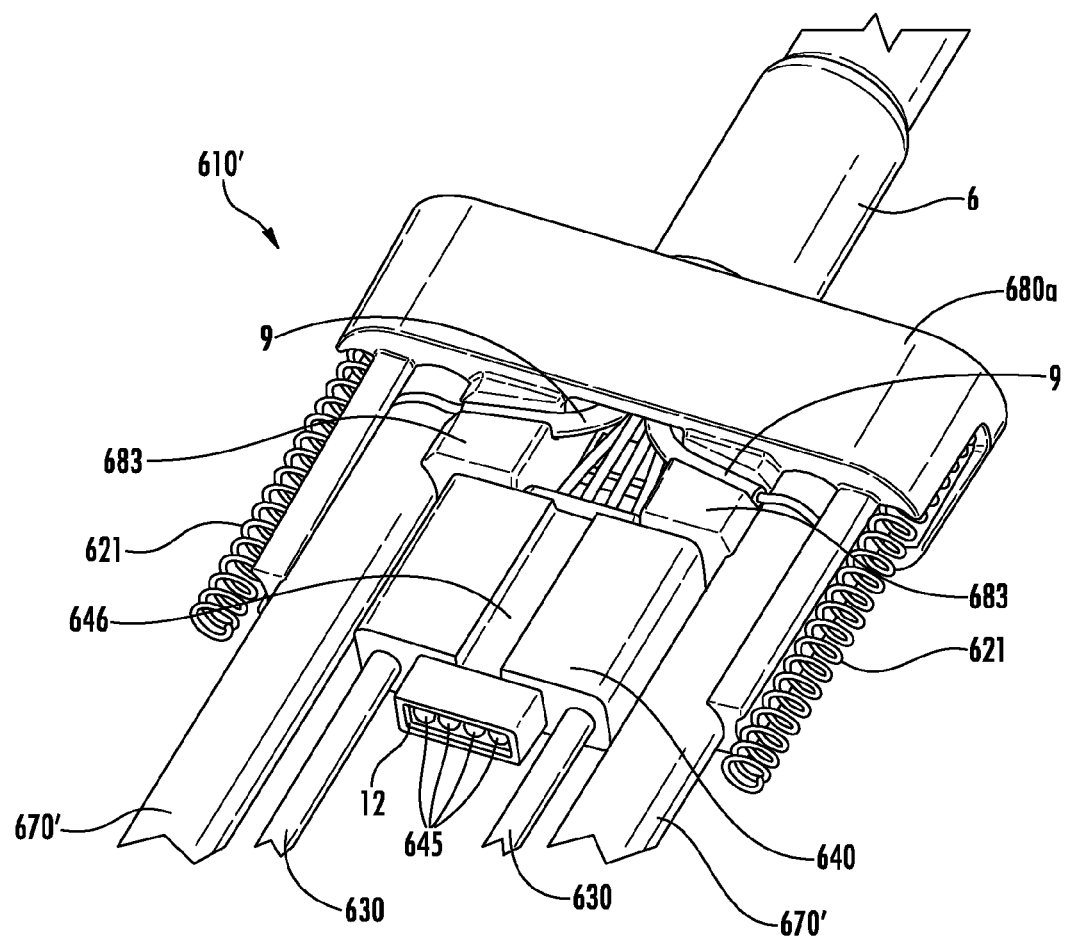
FIG. 41 is a partially assembled view of the optical plug connector similar to FIGS. 32 and 33, but includes electrical contacts and depicts the cover and a portion of the housing removed to show the electrical conductors attached to electrical contacts.

FIG. 41 optionally depicts plug 610' that is a variation of plug 610 having the electrical conductors 9 attached to alignment features that are configured as electrical contacts 670'. Plug 610' has the electrical contacts 670' received and secured in a first portion 680a of housing 680 like plug 610. Specifically, first portion of housing 680a has one or more passages appropriately sized for receiving the electrical contacts 670'. The electrical contacts 670' may be secured in the first portion 680a using any suitable method such as a mechanical attachment, an adhesive or other suitable method. Supports 683 may include one or more wire routing guides (not numbered) for providing a defined path for respective electrical conductors 9 to route to electrical contacts 670. Thereafter, an electrical connection may be formed between the electrical conductors 9 and the electrical contacts 670'.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical plug connector, comprising:
   an optical portion having an optical interface;
   a cover for protecting the optical interface in both an extended position and a retracted position, wherein the cover can translate toward the optical interface when connecting the optical plug connector and a portion of the cover allows transmission of optical signals therethrough; and
   a housing having at least one guide surface, wherein a portion of the cover has a sliding fit relative to a portion of the housing and may translate relative to the at least one guide surface of the housing.

2. The optical plug connector of claim 1, wherein a portion of the cover fits about a portion of the housing.

3. The optical plug connector of claim 1, wherein a portion of the cover is received into an end portion of the housing.

4. The optical plug connector of claim 1, wherein the cover has a front face footprint that is least 70 percent of a cross-sectional area of the optical plug connector.

5. The optical plug connector of claim 1, wherein the cover is operable to translate 3 millimeters or more towards the optical interface.

6. The optical plug connector of claim 1, wherein the housing includes a medial portion and the at least one guide surface is disposed on the medial portion.

7. The optical plug connector of claim 1, further including one or more cover guides, wherein the cover guides are one or more alignment pins and the cover includes one or more bores for receiving the one or more alignment pins.

8. The optical plug connector of claim 1, further including one or more cover guides, wherein the cover guides are one or more electrical contacts and the cover includes one or more bores for receiving the one or more electrical contacts.

9. The optical plug connector of claim 1, further including one or more resilient members for biasing the cover toward a forward position.

10. The optical plug connector of claim 1, wherein the optical portion has a nose that engages a cavity of the cover when in the retracted position.

11. The optical plug connector of claim 1, wherein the cover includes one or more cover guides.

12. The optical plug connector of claim 1, the cover including a body and a window attached to the body, wherein the window allows the transmission of optical signals therethrough.

13. The optical plug connector of claim 1, wherein the cover is formed as single component.

14. The optical plug connector of claim 1, further including one or more electrical contacts.

15. The optical plug connector of claim 1, the optical interface including a plurality of lenses integrally formed in the optical portion.

16. The optical plug connector of claim 1, further including a fiber organizer.

17. The optical plug connector of claim 1 being a portion of a cable assembly.

18. The optical plug connector of claim 15, further including a crimp band.

19. The optical plug connector of claim 1, wherein the cover may be removed and replaced.

20. An optical plug connector, comprising:
    an optical portion having an optical interface;
    one or more alignment pins;
    a cover for protecting the optical interface in both an extended position and a retracted position, the cover includes one or more bores for receiving the one or more alignment pins, wherein the cover can translate toward the optical interface when connecting the optical plug connector and a portion of the cover allows transmission of optical signals therethrough; and
    a housing having at least one guide surface, wherein a portion of the cover has a sliding fit relative to a portion of the housing and may translate relative to the at least one guide surface of the housing.

21. The optical plug connector of claim 20, wherein a portion of the cover fits about a portion of the housing.

22. The optical plug connector of claim 20, wherein a portion of the cover is received into an end portion of the housing.

23. The optical plug connector of claim 20, wherein the housing includes a medial portion and the at least one guide surface is disposed on the medial portion.

24. The optical plug connector of claim 20, further including one or more resilient members for biasing the cover toward a forward position.

25. The optical plug connector of claim 20, wherein the optical portion has a nose that engages a cavity of the cover when in the retracted position.

26. The optical plug connector of claim 20, wherein the cover includes one or more cover guides.

27. The optical plug connector of claim 20, the cover including a body and a window attached to the body, wherein the window allows the transmission of optical signals therethrough.

28. The optical plug connector of claim 20, wherein the cover is formed as single component.

29. The optical plug connector of claim 20, further including one or more electrical contacts.

30. The optical plug connector of claim 20, the optical interface including a plurality of lenses integrally formed in the optical portion.

31. The optical plug connector of claim 20 being a portion of a cable assembly.

32. The optical plug connector of claim 31, further including a crimp band.

33. The optical plug connector of claim 20, wherein the cover may be removed and replaced.

34. An optical plug connector, comprising:
    an optical portion having an optical interface;
    a fiber organizer for receiving optical fibers
    a cover for protecting the optical interface in both an extended position and a retracted position, wherein the cover can translate toward the optical interface when connecting the optical plug connector and a portion of the cover allows transmission of optical signals therethrough; and
    a housing having at least one guide surface, wherein a portion of the cover has a sliding fit relative to a portion of the housing and may translate relative to the at least one guide surface of the housing.

35. The optical plug connector of claim 34, wherein the cover includes one or more cover guides.

36. The optical plug connector of claim 34, the cover including a body and a window attached to the body, wherein the window allows the transmission of optical signals therethrough.

37. The optical plug connector of claim 34, wherein the cover is formed as single component.

38. The optical plug connector of claim 34, further including one or more electrical contacts.

39. The optical plug connector of claim 34, the optical interface including a plurality of lenses integrally formed in the optical portion.

40. The optical plug connector of claim 34 being a portion of a cable assembly.

41. The optical plug connector of claim 40, further including a crimp band.

42. The optical plug connector of claim 34, wherein the cover may be removed and replaced.

43. An optical plug connector, comprising:
   an optical portion having an optical interface;
   a cover for protecting the optical interface in both an extended position and a retracted position, wherein the cover can translate toward the optical interface when connecting the optical plug connector and a portion of the cover allows transmission of optical signals therethrough;
   a housing having at least one guide surface, wherein a portion of the cover has a sliding fit relative to a portion of the housing and may translate relative to the at least one guide surface of the housing; and
   one or more cover guides, wherein the cover guides are one or more electrical contacts and the cover includes one or more bores for receiving the one or more electrical contacts.

44. The optical plug connector of claim 12, wherein the window comprises glass.

45. The optical plug connector of claim 27, wherein the window comprises glass.

46. The optical plug connector of claim 36, wherein the window comprises glass.

\* \* \* \* \*

UNITED STATES PATENT AND TRADEMARK OFFICE
CERTIFICATE OF CORRECTION

PATENT NO. : 9,921,372 B2  
APPLICATION NO. : 15/061122  
DATED : March 20, 2018  
INVENTOR(S) : Davide Domenico Fortusini et al.

Page 1 of 1

It is certified that error appears in the above-identified patent and that said Letters Patent is hereby corrected as shown below:

On the Title Page

Item (72), Inventors, Line 1, delete "Ithica," and insert -- Ithaca, --, therefor.

Item (72), Inventors, Line 3, delete "Licolnton," and insert -- Lincolnton, --, therefor.

In the Claims

In Column 19, Line 33, Claim 4, delete "is least" and insert -- is at least --, therefor.

Signed and Sealed this  
Twenty-eighth Day of January, 2020

Andrei Iancu  
*Director of the United States Patent and Trademark Office*